US012723491B2

(12) United States Patent
Nix, III et al.

(10) Patent No.: US 12,723,491 B2
(45) Date of Patent: Sep. 1, 2026

(54) SYSTEM AND METHOD FOR STORAGE AND WITHDRAWAL OF ELECTRICAL ENERGY FROM A SUBTERRANEAN ENVIRONMENT

(71) Applicants: Kenneth Wayne Nix, III, Midland, TX (US); Ryan Patrick Edwards, Midland, TX (US)

(72) Inventors: Kenneth Wayne Nix, III, Midland, TX (US); Ryan Patrick Edwards, Midland, TX (US)

( * ) Notice: Subject to any disclaimer, the term of this patent is extended or adjusted under 35 U.S.C. 154(b) by 206 days.

(21) Appl. No.: 18/244,908

(22) Filed: Sep. 11, 2023

(65) Prior Publication Data

US 2024/0003227 A1 Jan. 4, 2024

Related U.S. Application Data

(63) Continuation-in-part of application No. 18/120,576, filed on Mar. 13, 2023, now Pat. No. 12,249,727.

(Continued)

(51) Int. Cl.

| | |
|---|---|
| ***E21B 41/00*** | (2006.01) |
| ***F24T 50/00*** | (2018.01) |
| ***H01M 10/627*** | (2014.01) |
| ***H02J 3/007*** | (2026.01) |
| ***H02J 3/32*** | (2026.01) |
| ***H02J 7/34*** | (2006.01) |

(Continued)

(52) U.S. Cl.

CPC ........ *E21B 41/0085* (2013.01); *H02J 3/0075* (2020.01); *H02J 3/32* (2013.01); *H02J 7/345* (2013.01); *F24T 50/00* (2018.05); *H01M 10/627* (2015.04); *H01M 2220/10* (2013.01); *H02J 2101/20* (2026.01); *H02J 2103/35* (2026.01); *H02J 2207/50* (2020.01)

(58) Field of Classification Search

CPC ....... E21B 41/0085; H02J 3/0075; H02J 3/32; H02J 7/345; H02J 2207/50; H02J 2203/10; H02J 2300/20; H01M 10/627; H01M 2220/10; H01M 50/251; H01M 10/613; H01M 10/64; H01M 10/6556; H01M 50/204; F24T 50/00

See application file for complete search history.

(56) References Cited

U.S. PATENT DOCUMENTS

| | | | |
|---|---|---|---|
| 6,014,013 | A | 1/2000 | Suppanz et al. |
| 7,699,102 | B2 | 4/2010 | Storm et al. |

(Continued)

OTHER PUBLICATIONS

Matos, Tania (authorized officer); ISA/US; International Search Report mailed Jan. 22, 2024 for PCT/US2023/032503 and references cited therein.

*Primary Examiner* — Carlos Amaya

(74) *Attorney, Agent, or Firm* — Vorys, Sater, Seymour and Pease LLP

(57) ABSTRACT

A subterranean energy storage and retrieval system, having a wellbore; an energy storage cell placed in the wellbore; and an electrical connection attached to the energy storage cell to a surface of the wellbore. The energy storage system is managed and regulated by a power management system coupled to rechargeable power cells. A bypass circuit is utilized to remove specific energy storage cells from the circuit. Temperature regulation is managed geothermally through the energy storage housing.

19 Claims, 21 Drawing Sheets

Related U.S. Application Data

(60) Provisional application No. 63/319,293, filed on Mar. 12, 2022.

(51) Int. Cl.

| | |
|---|---|
| ***H02J 101/20*** | (2026.01) |
| ***H02J 103/35*** | (2026.01) |

(56) References Cited

U.S. PATENT DOCUMENTS

| | | | | |
|---|---|---|---|---|
| 2012/0091964 | A1 | 4/2012 | Vance et al. | |
| 2013/0026978 | A1 | 1/2013 | Cooley et al. | |
| 2015/0326049 | A1* | 11/2015 | Cooley ................. | H01M 10/46<br>320/130 |
| 2021/0336478 | A1* | 10/2021 | Chaves ................. | H02J 15/007 |

* cited by examiner

1902
SURFACE EQUIPMENT
1701
2021
1702
2019

1906
POWER
SOURCE
1904
1908
1910
1919
100
101
1914
1912
1805

SYSTEM AND METHOD FOR STORAGE AND WITHDRAWAL OF ELECTRICAL ENERGY FROM A SUBTERRANEAN ENVIRONMENT

CROSS REFERENCE TO RELATED APPLICATIONS

This patent application claims priority from U.S. provisional patent application Ser. No. 63/319,293 and entitled A System And Method For Storage And Withdrawal Of Electrical Energy From A Subterranean Environment Filed On Mar. 12, 2022, and this patent application claims priority from U.S. non-provisional patent application Ser. No. 18/120,576 and entitled A System And Method For Storage And Withdrawal Of Electrical Energy From A Subterranean Environment Filed On Mar. 13, 2023 by which are both hereby incorporated by reference in its entirety.

BACKGROUND OF THE INVENTION

Large footprint surface battery banks are often used as an energy buffer to address both peak, over demand from the nation's electric grid as well as non-peak output hours for wind and solar power generation. Surface batteries, however, have inherent risks associated with them. They require a large footprint and are open to the outside environment if a hazardous chemical situation were to happen. Battery fires are an added risk.

FIELD OF THE INVENTION

The invention relates to the field of energy storage. The invention disclosed herein relates to grid energy storage in a subterranean environment, in particular, to a subterranean power supply for supplying power to an energy grid or surface equipment that could be powered by an energy grid.

SUMMARY OF THE INVENTION

A system and method for a subterranean energy storage and retrieval system, converting a wellbore to an energy storage system by installing energy storage cells in the wellbore with an electrical connection attached to the battery at a surface of the wellbore. Thermal management is achieved through geothermal regulation via the subterranean energy storage housing.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions. The drawings are not drawn to scale.

DETAILED DESCRIPTION OF AN ILLUSTRATIVE EMBODIMENT OF THE INVENTION

Figure 1:
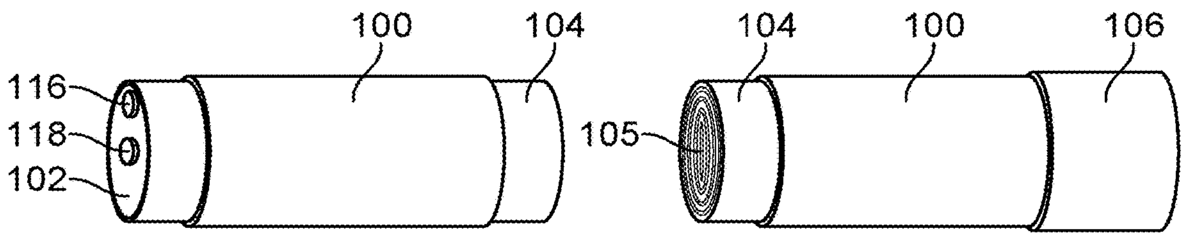
FIG. 1 depicts a side view of a particular illustrative embodiment of the invention.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist with the description and to provide a visual representation of certain aspects of the subject matter described herein. The figures are drawn to scale, but do not show all the structural details, nor do they limit the scope of the claims.

In the economy's shift away from nonrenewable oil and gas energy sources, renewable energy sources such as, but not limited to, solar, wind, and wave energy are being harnessed to fill the world's energy needs. It has become necessary to utilize energy storage solutions to buffer the intrinsic, inconsistent energy demands across the industry.

For example, it has generally known that wind and solar energy are capable of producing an excess of electricity beyond the immediate grid demand during low-peak times but often lack the capacity to fill the grid demand at high-peak times, at night or when the wind is not blowing. Thus there is a need to store excess energy during peak production so as to be consumed when these energy sources cannot keep up with real time demand. Current methods of grid energy storage largely consist of a plurality of lithium battery filled containers installed in a cluster on concrete or asphalt, at a surface installation site. Generally, these surface installation sites require a change of use for land and can easily become a health, safety, and environmental issue when there is a failure. The growing demand for surface grid storage is growing more complex as the industry is evaluating and scrutinizing surface site locations to address the resultant environmental impacts. Moreover, with the projected demand for grid storage, increased change of land use and the associated environmental impact has become an issue for these surface grid storage installations. Additionally, when surface grid storage suffers catastrophic failure, the resulting health, safety, and environmental negatively impacts influence local communities near the surface installations. Attendant hazards such as lithium battery fires, which are notoriously difficult to extinguish, are causing elevated risk for fire fighters, and their exposer to highly toxic fumes associated with lithium battery fires.

Thus, there is a need for a solution that entails constructing a power supply for use in grid energy storage in a subterranean environment that not only minimizes any surface footprint and environmental hazards, but also safely contains any catastrophic failure isolating failure hazards from the surface. To this end, abandoned wellbores in the oil and gas industry serve as an appropriate framework for subterranean grid storage installations. Converting a steel cased wellbore into a fit for purpose structural housing provides a robust framework for a subterranean grid energy storage installation similar to a good foundation when building a house. Ideally, this solution is economical to construct and operate, thereby substantially reducing most of the inherent issues with surface installations that utilize lithium and other power storage technologies including, but not limited to, negative economic, logistical, and health, safety, & environmental standpoints.

Many of the known technology approaches today to recycle an oil and gas well for energy storage attempt to use geological formations within the earth to store various forms of heat or potential energy in order to bring energy into an electrical grid on demand. There are, however, inherent inefficiencies associated with this use of the earth's geological formations. While the storage industry takes advantage of the geological formations having existing floors and ceilings due to the various existing cap rocks which can halt the upward or downward movement of the gasses and fluids, those who are pursuing these known technologies have not solved the issue of horizontal movement in a porous formation coupled with the need for very large recharge volumes in order to store enough energy to be a useful and relevant source of energy. Moreover, when there is a geologic solution, it is typically unique to a specific location, such as a salt dome, which is unique to that single location and not replicable elsewhere at another location.

The present invention provides a solution to these problems associated with the prior attempts discussed above. In one particular embodiment of the invention, a power storage system is constructed to operate in a subterranean environment for storing power underground in a subterranean location until such time that the stored power is discharged back to surface for use on demand. In a particular illustrative embodiment of the invention, a subterranean power storage system provides an energy source, such as an electrical generator, which supplies energy to a subterranean power management system. The power management system is coupled to one or more rechargeable power storage mediums. In a particular illustrative embodiment of the invention, the system completes an electrical circuit back to surface so that the system can store energy underground in a wellbore and extract the subterranean stored energy to supply the stored energy back to surface on demand. In a particular illustrative embodiment of the invention, the system is configured and constructed to operate in geothermal environments without relying on active cooling, utilizing a housing connected in thermal conductivity to earth so that the earth surrounding the housing is used as a heat sink. In a particular illustrative embodiment of the invention, the rechargeable power storage medium is a capacitor. In another particular illustrative embodiment of the invention the rechargeable power storage medium is an ultracapacitor.

In another illustrative embodiment of the invention, a method is provided for constructing a subterranean energy storage system. The method includes providing a power source from surface, providing a rechargeable power cell installed into a section of tubing downhole in an abandoned wellbore. In a particular illustrative embodiment of the invention, the rechargeable power cell is a chemical battery. In another particular illustrative embodiment of the invention, the rechargeable power cell is a capacitor. In another particular illustrative embodiment of the invention the rechargeable power cell is a combination of a chemical batter and a capacitor.

In a particular illustrative embodiment of the invention, the subterranean power storage system provides an energy source feeding into a power management system, coupled to one or more rechargeable cells, with the system completing a circuit back to surface so as to store energy underground and extract energy back to surface. In a particular illustrative embodiment of the invention, the system is configured to operate in subterranean geothermal environments without relying on active cooling.

In another illustrative embodiment of the invention, a method for fabricating a subterranean storage system is disclosed. The method includes but is not limited to a power source from surface, a rechargeable power cell consisting of chemical battery cells, capacitors cells, or a combination thereof, coupled to a power management system circuit to manage a rechargeable power cell or cells, by protecting the rechargeable power cells from operating outside a desired operating area, monitoring its state of charge of the power cells, voltage, temperature, calculating secondary data, reporting the secondary data, controlling its environment, authenticating it and/or balancing it. Furthermore, the power management system would be responsible for regulating the charge and discharge current and voltage of the capacitor cells or chemical battery cells, so as to charge or discharge in a prescribed method. The subterranean power storage system includes an energy source feeding into at least one power management system, coupled to one or more rechargeable cells, with the system completing the circuit back to surface so as to store energy underground and extract energy back to surface. The system is configured and constructed to operate in geothermal environments without relying on active cooling.

In another particular illustrative embodiment of the invention, a method for fabricating a subterranean energy storage system is disclosed. The method includes providing a power source at the surface of a repurposed wellbore, a rechargeable power cell coupled to a bypass circuit. In a particular illustrative embodiment of the invention the bypass circuit is a solid state device. In another particular illustrative embodiment of the invention the bypass circuit is a mechanical device. The bypass circuit is operable to isolate at least one grid energy power storage cells from the rest of the subterranean storage cells and the storage system circuit.

Disclosed herein are various illustrative embodiments of the present invention, providing configurations of a subterranean power storage system constructed, in part, from an abandoned oil and gas wellbore. The abandoned oil and gas wellbore is repurposed when oil and gas is no longer desired nor feasible to produce oil and gas from the wellbore. To provide context, an oil and gas wellbore would be defined as a borehole that was drilled with the intent to aid in some process of mineral extraction or disposal of oil and gas waste such as water, drill mud, cuttings, or any other medium generated, or disposed of in the oil and gas industry, where a wellbore would be used.

Conversion from an oil and gas wellbore to a subterranean energy storage system, contained in a repurposed wellbore, also referred to herein as a housing, is now described. In a particular illustrative embodiment of the invention, an oil and gas wellbore conversion process begins with sealing off the wellbore from access to the mineral producing formations surrounding the wellbore. Sealing is accomplished using a combination of cement and mechanical plugs, preferably forming a hydraulic seal. The sealed wellbore is then cleaned and evacuated of any residual oil and gas related fluids and is now appropriate for use as a housing for the subterranean power storage system.

In a particular illustrative embodiment of the invention, a subterranean energy storage system is constructed using a converted subterranean housing (repurposed wellbore), a tubing power string deployed down the repurposed wellbore (housing), a power management system having control circuitry, and power cell bypass circuitry.

Sections of tubing are joined together for forming a tubing power string (also referred to herein as "tubing") and configured by installing one or more rechargeable power cells in at least one section of the tubing power string along with a power management circuitry and a bypass circuitry coupled to the rechargeable power cells in the section of tubing. In a particular illustrative embodiment of the invention, the rechargeable power cells are chemical battery cells. In another particular illustrative embodiment of the invention, the rechargeable power cells are capacitors. In another particular illustrative embodiment of the invention, the power cells are a combination of chemical batteries and capacitors. Multiple rechargeable power cells are configured and installed in series inside of the tubing sections, with multiple tubing sections configured and connected in series within the subterranean housing. In another particular illustrative embodiment of the invention, other currently and future available power storage cells are also appropriate for installation in the tubing. In another particular embodiment a hybrid nickel hydron battery cell is provided for energy storage.

The rechargeable power cells are coupled to the power management control circuitry. The power management control circuitry (also referred to as the power management system) regulates) power into and out of the rechargeable power cells by shutting off, limiting, and/or redirecting current to the coupled power cells as needed based on measurements taken from the power cell. When the circuitry senses a cell is approaching its charge limit, it will steer excess current to the least charged cells; it will remove extra charge from the most charged cells, or a combination of both as needed. Additionally, the power management system monitors and reports each of the rechargeable power cells states for percentage of charge, temperature, percentage of discharge, and health.

A bypass circuit is incorporated into the subterranean energy storage system that is configured to operably remove at least one rechargeable cells from the deliverable power circuit, thereby providing functional control of the installation's deliverable energy capacity. The bypass circuit is also used to circumvent bad rechargeable cells. The bypass circuit is also operable to bypass one or more rechargeable power cells from charging when desired, such as when a rechargeable power cell is fully charged to protect from overcharging. The bypass circuitry is also used to protect from over temperature in a rechargeable power cell. The bypass circuit is also operable to bypass one or more tubing sections containing rechargeable power cells.

The tubing and tubing sections support the rechargeable power cells as part of the construction and installation process, and are a protective member of the overall system, providing structural integrity and physical stability for the rechargeable power cells.

In a particular illustrative embodiment of the invention, the tubing power string sections are joined together one at a time at the surface of the wellbore (housing) as they are lowered into the prepared storage system housing, in a series configuration. In a particular illustrative embodiment of the invention, the tubing power string assembly hangs from the top of a housing's wellhead. In another particular illustrative embodiment of the invention, the tubing power string assembly rests on the bottom of the housing's mechanical seal. In a particular illustrative embodiment of the invention, the tubing power string assembly hangs from the top of a housing's wellhead and rests on the bottom of the housing's mechanical seal.

In a particular illustrative embodiment, the repurposed wellbore, (now converted into a subterranean power storage system housing), is a critical component of the overall subterranean power storage system. The subterranean power storage system housing provides protection from tectonic stresses downhole and provides a thermal heat sink connection to the earth for temperature regulation of the subterranean power storage system. Moreover, because oil and gas wellbores are constructed to withstand thousands of pounds per square inch (psi) of pressure, the power storage system housing provides a means to substantially contain and localize downhole any catastrophic failure of the subterranean power storage system may encounter.

Thus the inventors saw a long felt need for a solution. By changing the focus from kinetic energy to chemical batteries and capacitors, it became clear that the solution does not include the formation at all. With battery banks stored and safely trapped underground, environmental concerns and surface footprint concerns are mitigated. Any potential hazardous components are contained in a polymer shell, inside sealed steel tubing, inside sealed steel casing with a cement sheath around it. By focusing on the wellbore, the present invention provides a solution that is economical, scalable, and even environmentally friendly due to the repurposing of borehole equipment that is readily available and in current use. The present invention discloses a system and method for converting an existing oil and gas borehole into a singular large subterranean power storage system, also referred to herein as a "borehole battery," "battery sticks" wherein multiple rechargeable energy storage cells are ganged together to form a subterranean power storage system which are connected together to form the subterranean power storage system.

In a particular illustrative embodiment of the invention, a battery stick formed from a plurality of connected battery cells stores electrical energy, i.e., a "borehole battery." This arrangement completely transforms the functional use of an unused and abandoned borehole, changing the abandoned borehole to a borehole battery which provides power on demand to users at the surface of the borehole. it could also include wells that are nearing the end of their economic life and are a P&A candidate. The closer the well is to the end of its economic life, which can also be a component of the price of oil and gas at the time of evaluation, it may make sense to accelerate the conversion of the well into an electrical storage device as that will provide a higher return on capital to the owner of the well. Economics can play a big part in an owner of the wellbore looking to maximize their return on their original sunk capital in that hole. The short of this is there are more candidates than just unused or abandoned wells that can use this technology. Depending on what happens to the price and oil/gas/electricity in the future, the potential exists that a well with plentiful reserves of oil and/or gas could still be converted to a battery because it is more economically viable. The borehole no longer functions as a part of a system that extracts natural resources from a subterranean environment. In a particular illustrative embodiment of the invention, a system and method is disclosed that combines various repurposed items utilized in the oil and gas industry along with some proprietary items in order to create a large subterranean energy storage (borehole) battery.

In a particular illustrative embodiment of the invention, the system and method are used to convert an oil and gas borehole, in some instances, an abandoned borehole into a battery. During the conversion, the system and method are used to seal a vertical section or "interval" of a wellbore in order to prevent any communication of the sealed interval of the wellbore with a surrounding formation. The sealed interval could have previously been a productive interval of the wellbore. The final plug in the conversion of the borehole into a battery yields a sealed and isolated cylinder within the sealed interval of the wellbore, providing a foundation of the battery construction. That final plug now becomes the solid base of the battery and is involved as a part of a mechanism that can energize/de-energize the cells that make up the battery wherein the battery includes but is not limited to the wellbore that serves an outer shell for the battery and the many other pieces contained within it. This conversion of an oil and gas wellbore could be generally the same for any well that was drilled but never put into production or for other types of wellbores such as geothermal.

In a particular illustrative embodiment of the invention, the system and method repurpose a wellbore of an existing oil and gas well. Currently, when an oil or gas well is deemed to be no longer economically viable, the person or entity who owns the individual well is required to initiate a process commonly referred to as P&A (plugging and abandonment). This conversion process involves multiple steps and materials all intended to stop any migration of fluids and or gases, trapping them in place in their subterranean environment surrounding the borehole. This process protects shallower formations, water tables, and the surface environment. The end result is a completely sealed borehole that is no longer accessible for any use whatsoever from the surface down to the original drill depth.

Over time, the market has attempted to address how to reuse, or continue use of these wells after the usable economic lifespan of the original wellbore has been exhausted. There are technologies in existence that indeed address this. Current technology in the industry has focused on the reservoir as a kinetic/potential energy storage vessel for electricity generation. According to Science Direct, the main Underground Energy Storage Technologies ("UEST") for renewable integration being used today are: Compressed Air Energy Storage ("CAES"); Underground Hydro Storage ("UPHS"); Underground Thermal Energy Storage ("UTES"); Underground Gas Storage ("UGS"); and Underground Hydrogen Storage ("UHS").

These energy formation storage technologies are all associated with potential energy primarily in the form of chemical storage or kinetic energy in the form of thermal and motion energy where as there is a reaction that potentially creates electrical energy through a secondary surface electrical generator that can be transmitted to the grid. The main point of note with all of these methods is that the UESTs mentioned above all use a borehole as an access point/conduit to move something from above the surface into a subterranean environment. In every discoverable case, the wellbore is a means to an end, a pathway to input and extract kinetic or thermal energy. The wellbore is not an actual storage vessel for anything. The earth's formation is the storage vessel.

The inventors have not found any circumstances in which anyone has repurposed an oil and gas wellbore into a battery. In a particular illustrative embodiment of the invention, the system and method completely change the intended use and purpose of an existing wellbore by constructing a battery made within an isolated wellbore that is a source of electric power consisting of one or more electrochemical cells with external connections for powering electrical devices. Not only does the present invention not have anything to do with kinetic energy storage, but the battery design seals the formation from the battery as a matter of primary functionality. The inventors believe that this construction and utilization of a sealed and isolated wellbore is completely unique in purpose and in practice to the way any wellbore formation is utilized currently.

In the past, small form factor batteries have been utilized in a wellbore to power small downhole devices such as memory gauges and small valves. This use of small form factor batteries is not unique in oil and gas extraction where the formation is monitored or access to the formation is controlled. These small form factor batteries are a onetime, limited use purpose. In these cases, the cells enter the wellbore with a charge and cannot be recharged while in the wellbore. Having an operational life of only a few hours, the small form factor batteries are meant to power a device downhole and will either come out of the well after treatment or will be permanently abandoned downhole. These small form factor batteries or battery cells cannot power anything at surface, have no conductive connection to the surface, cannot be monitored while in the well, and cannot be serviced while in the wellbore. Furthermore, this use of small form factor batteries is not intended, nor does the ability exist to function as a storage vessel for charging, storing, and extracting electricity to the surface in any way.

In a particular illustrative embodiment of the invention, the system and method do not provide a battery to power downhole equipment as in the above example, rather, the present invention provides power storage for use at the surface. In a particular illustrative embodiment of the invention, the system and method accepts a charge from surface; stores a charge for a period of time downhole; and enables extraction of the stored energy back to surface. Unlike the current and past use of downhole batteries, the present invention provides a subterranean wellbore battery ("borehole battery") that is connected to the wellbore surface, wherein the borehole battery is charge cycled over and over again in place downhole, and again, will not have anything to do with the reservoir that has been abandoned and sealed away from the wellbore.

The inventors believe that converting a wellbore into a battery meets a long felt need and thus passes the litmus test of being non-obvious. It has been a long standing practice of Oil and Gas producers, as well as various regulatory bodies, to P&A wells and never use them again. The "A" in P&A does stand for abandonment. The P&A process has been around since at least the late 1800's. It is our belief that a significant amount of time has passed, as well as a significant number of people involved in the process, for the invention to be deemed as non-obvious as solving a problem and providing a long felt needed solution.

In a particular illustrative embodiment of the invention, the system and method are used to convert a wellbore that recycles, repurposes, and transforms the wellbore and associated existing and in place equipment into a literal large capacity chemical battery, i.e., a borehole battery, wherein the battery utilizes lithium, lead, sodium ion, or any other chemical battery technology where an anode, a cathode, an electrolyte medium, and permeable barrier is provided.

In a particular illustrative embodiment of the invention, the system and method provides an exterior casing on the individual battery cells that combine to make up the borehole battery. The exterior battery casing shields and protects the borehole battery and the individual battery cells that make up the borehole battery that is inserted into the borehole, wherein the exterior casing protects the borehole battery and its aggregation of individual battery cells from external physical forces that could damage the borehole battery.

In a particular illustrative embodiment of the invention, the system and method provide a borehole battery that operates in a vertical configuration constructed in a wellbore, in a subterranean environment, thereby minimizing the surface footprint the battery. In a particular illustrative embodiment of the invention, the borehole battery is constructed extending from a borehole surface and down into a wellbore several thousand feet below the surface into which the borehole is drilled, subjecting the borehole battery to tectonic forces present downhole, in which the batteries' external casing would protect it from. In a particular illustrative embodiment of the invention, the battery cells are placed in a recycled wellbore casing that provides robust protection of the battery cells contained therein. If one were to build a subterranean battery without recycling a wellbore, the hole that would be drilled to house the battery cells should be lined with a protective casing. Thus, the protective casing is a preferred structural component for maintaining the integrity of the borehole battery downhole.

As modern large capacity battery packs sometimes require a way to cool the battery, so too does the subterranean borehole battery. In a particular illustrative embodiment of the invention, a cooling system circulates a cooling medium, a gas such as air or nitrogen, or a fluid such as water, is pumped downhole and caused to flow across the power cells (battery cells) that make up the borehole battery while deployed downhole. The wellbore casing contains the battery cells and provides a flow path that facilitates a cooling chamber by circulating air or a fluid to cool the battery cells. The cooling medium is pumped and flows from surface, down an inner annulus provided in and through the borehole battery power cells, and then back up to the surface through the cell's outer annulus space. The outer annular space is created by a space between the recycled wellbore's internal diameter and the smaller outside diameter of the borehole battery's individual battery cells outside diameter. Just like any other high-capacity battery, without this needed cooling, the battery would suffer premature failure. The wellbore provides a cooling flow return path for cooling the battery.

Chemical battery cells have a cathode and an anode. Of course, both the cathode and anode are electrically connected to the system to harness the battery's functionality. The subterranean borehole battery is no different. Access to the top connection for the wellbore battery is fairly simple to connect to, as it is at surface. The bottom of the battery, several thousand feet underground in the wellbore, is more complicated. Once again, the space between the recycled wellbore and the battery cells forms an outer annulus between the surface of the battery and the inside wall of the wellbore that is also utilized as an electrical path for this electrical connection at the surface of the wellbore. With this access, a connection point to the bottom of the battery is provided through the outer annulus.

In a particular illustrative embodiment of the invention, the wellbore casing is a part of the battery. The present invention goes far beyond merely storing cells in a wellbore. The fact that the casing from the well was at one point part of the well could be considered secondary to the invention using the repurposed wellbore casing as an appropriate material and geometry to provide a stable battery housing, structural support, connection access, and a flow path for cooling. The casing in the wellbore is recycled and repurposed to become a functional part of the borehole battery itself.

In a particular illustrative embodiment of the invention, the system and method provide a borehole battery for large scale storage of electrical energy. Many existing wells in the United States as well as the world are extremely deep and could house connected cells to form a borehole battery up to lengths over a mile long. In a particular illustrative embodiment of the invention, the system and method extends the useful life of an existing item, such as a wellbore casing by fully repurposing it. In a particular illustrative embodiment of the invention, the system and method enhances electrical grid safety by impeding access from a terroristic surface threat or natural disaster due to the limited exposed footprint of the battery. In a particular illustrative embodiment of the invention, the system and method utilize a minimal surface footprint compared to other competitive grid related storage systems. No additional disruption is needed to surrounding environments as the system and method of the present invention use an existing electrical grid, ground transportation access, and an existing surface pad whereas many competing grid storage solutions are not in a wellbore and involve building large surface facilities and disrupting the environment around it.

In a particular illustrative embodiment of the invention, the borehole battery cells can be recycled and replaced with different or new emerging battery technologies as they are developed, which can be less impactful on the environment and allow for higher storage density of electrons. All of the costs associated with building out a well have already been sunk allowing for a significant reduction in build out costs for each potential battery location.

In another particular illustrative embodiment of the invention, the system and method repurposes oilfield related tubing to house cells of the borehole battery. This is similar to the repurposing of the wellbore described above, in converting wellbore tubing into a battery as the system and method completely changes the intended use and purpose of an existing item, wellbore tubing. The inventors are unaware of any circumstances in which anyone has repurposed oil and gas tubing into a housing for battery related cells. The inventors believe that converting oilfield tubing as a housing of battery cells is a nonobvious use of the wellbore tubing. According to the Society of Petroleum Engineers ("SPE") PetroWiki site, tubing is defined as "the normal flow conduit used to transport produced fluids to the surface or fluids to the formation." SPE further defines the purpose as "the use of tubing permits better well control because circulating fluids can kill the well . . . " In the past, tubing has been used to move fluids and gas inside of a wellbore and not to statically store something such as a cell of a battery which is accomplished by the present invention. Using tubing within oil and gas wells has been a vital part of the wells for many, many years and the inventors believe that a significant amount of time has passed, as well as a significant amount of people involved in the process, for the solution provided by the present invention to be deemed a long felt need and nonobvious.

In a particular illustrative embodiment of the invention, the system and method use of tubing as a battery cell storage device to create a tubing-based borehole battery, which provides many benefits in being a part of a wellbore battery system. The tubing is readily available and provides a strong housing material for the battery cells that make up a borehole battery in tubing, which allows for compacting the density of the battery cell increasing the effectiveness of each battery cell. The tubing makes it easy to install and retrieve within the battery casing, as it works with existing workover equipment. In a particular illustrative embodiment of the invention, the system and method provides for the connection of multiple cells through the threaded ends of each piece of tubing.

The inventors believe that by changing the intended purpose of an oil and gas well and associated wellbore equipment and hardware, from that which is involved in the extraction of hydrocarbons, to that of being a battery power source, the present invention is novel, nonobvious, and useful. In a particular illustrative embodiment of the invention, the system and method assembling of connectors, switches, tubing, electrochemical cell materials, and wellbore casing (the final enclosure) creates a single subterranean borehole battery.

In a particular illustrative embodiment of the invention, a system and method for storage and withdrawal of electrical energy from a subterranean environment is disclosed. In a particular illustrative embodiment of the invention, design and conversion of oil and gas wells to utilize a better way for energy storage that matches the current goals and needs of the green energy revolution that we are currently experiencing via the installation of underground battery banks forming a borehole battery for use as energy storage. In the past, large footprint surface battery banks have often been used as an energy buffer to address both peak over demand from the nation's electric grid as well as non-peak output hours for wind and solar power generation. Surface batteries, however, have inherent risks associated with them. Surface batteries require a large footprint and are open to the outside environment if a hazardous chemical situation were to happen. Battery fires are an added risk for surface batteries. With battery banks stored safely underground, in wellbores, environmental concerns and surface footprint concerns are mitigated. Any potential hazardous components are contained in a polymer shell, inside sealed steel tubing, inside sealed steel casing with a cement sheath around it.

As oil and gas wells become depleted and reach their end of life, the depleted wells would normally become plugged and abandoned. Instead of plugging the well, there exists an opportunity to convert the wellbore into a battery for use in the electric grid. This is achieved by recycling the wellbore to be part of the battery's structural casing then manufacturing and installing individual battery cells in jointed or continuous tubing for final install into a wellbore. Multiple manufactured tubular shaped chemical battery cells would be installed stacked together in each wellbore with the electrical connections on each end of the batteries meeting either in series, in parallel, or in some combination thereof to achieve a workable or optimal voltage/amperage combination.

Figure 2:
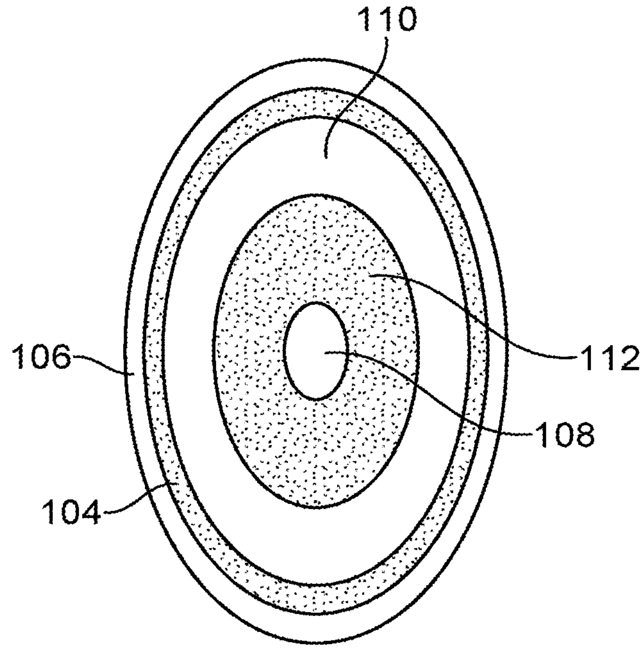
FIG. 2 depicts an end view of a cross section of a particular illustrative embodiment of the invention.

Turning now to FIG. 1 and FIG. 2, as shown in FIG. 1 and FIG. 2, in a particular illustrative embodiment of the invention, an example, a subterranean 4,800 feet deep well supports the installation of 120 battery cells, 40 feet long each, 1.5V per cell. In series the string of cells, (based on lead acid technology as an example), yields a theoretical 240V and roughly 5,260 Amp Hrs., or 1,260 kWh. If the average house uses 893 kWh/month of power, one converted well could store enough power to run a house for 1.4 months. Electrical energy stored in the subterranean well is subsequently withdrawn to power residential and industrial electrical equipment. As shown in FIG. 1, a battery cell end cap adjoins a battery cell end cap 102 protrudes from steel joint tubing 100. Battery cell polymer insulation 104 surrounds battery cell core 105 and is connected to a first end of a battery cell. A casing collar 106 is used to connect adjacent sections of steel jointed tubing 100 to form a borehole battery made up of multiple battery cells 102. FIG. 2 shows an end view of a cross section of the battery cell having an anode connection 110, a cathode connection 108, battery cell polymer insulation 104 and second insulator 112.

In a particular illustrative embodiment of the invention, the battery is not limited to a standard tubular rechargeable battery construction methods at its core. The battery core is wrapped in an electric insulator with conductive endcaps to allow transfer of power from one cell to the next. The sealed battery would then be installed into steel tubing commonly used in the oil and gas industry. The tubing joints are then installed into a vacated subterranean wellbore with low-cost conventional workover rigs or some other conveyance. The fit for purpose tubing joint collars are designed to hold the weight of the battery cells and transmit electrical current in either series or parallel configuration to the next cell. The subterranean battery would be integrated into the power grid for use.

Figure 3:
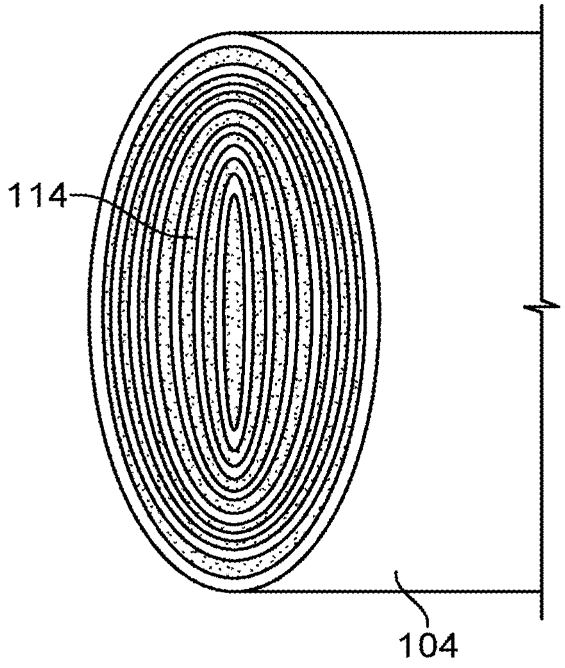
FIG. 3 depicts a perspective view of a particular illustrative embodiment of the invention.
Figure 4:
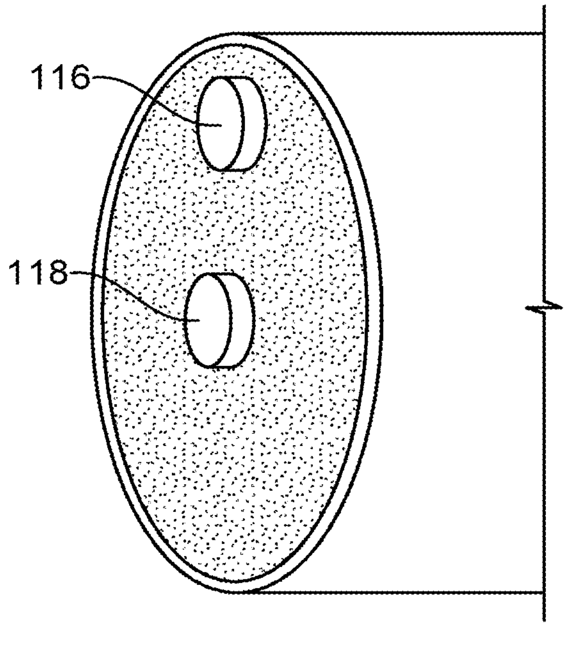
FIG. 4 depicts a perspective view of a particular illustrative embodiment of the invention wherein, each end of the cell will have a cap with two conductors to pass current along to the next cell.

Turning now to FIG. 3, FIG. 3 depicts a schematic representation a basic cutaway 114 of the proposed battery core. As shown in FIG. 3, a core, is manufactured separately and encased in an insulating polymer. Turning now to FIG. 4, as shown in FIG. 4, each end of the cell will have a cap with two conductors 116 and 118 to pass current along to the next cell and to a surface connector.

Figure 5:
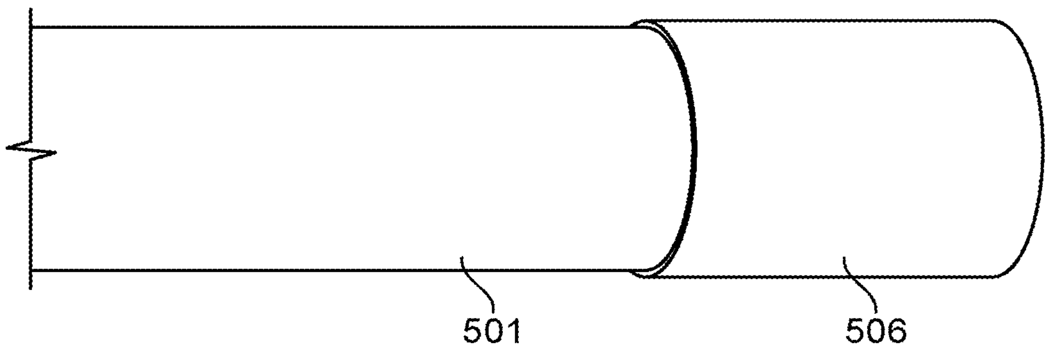
FIG. 5 depicts a side view of a particular illustrative embodiment of the invention wherein the entire cell will be installed into commodity oilfield grade steel tubing and will be connected with a specialized tubing collar.
Figure 6:
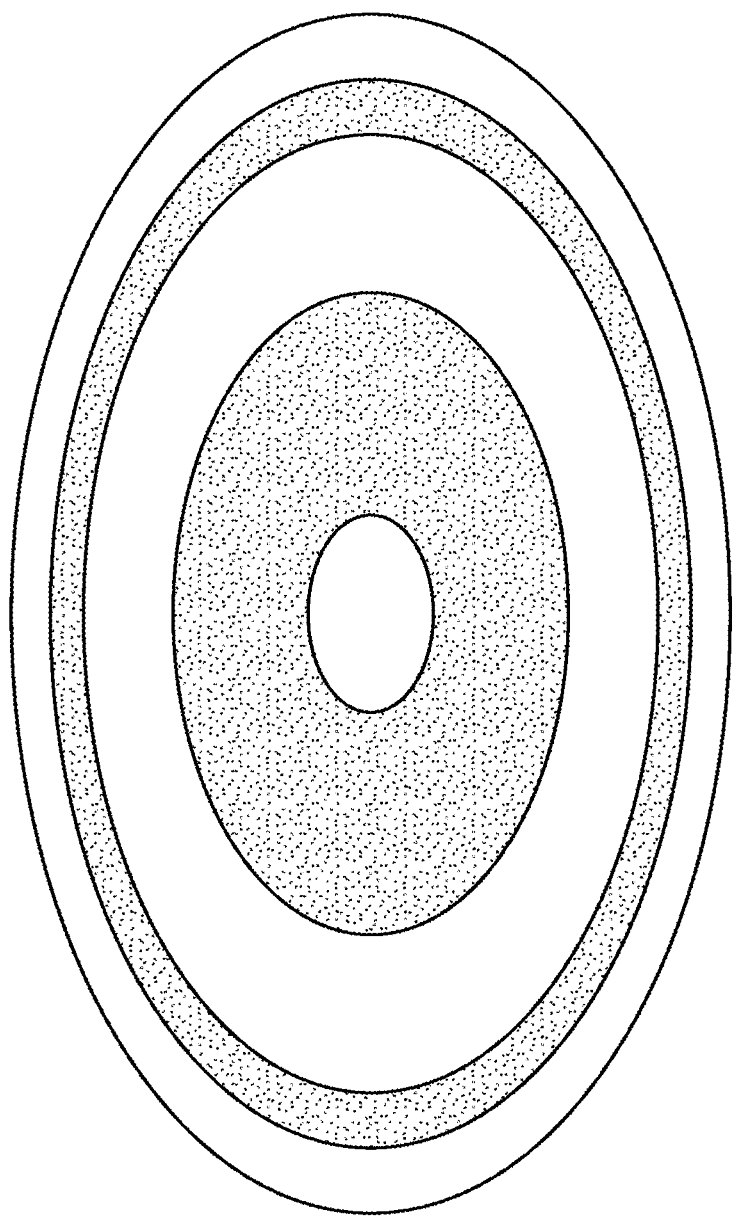
FIG. 6 depicts an end view of a cross section of a particular illustrative embodiment of the invention wherein each tubing collar will be designed to not only hold the weight of one cell in a vertical position but will have two conductive paths through it to interface with the power cell end caps.

Turning now to FIG. 5, as shown in FIG. 5, in another particular embodiment, the entire cell is installed into a commercially available, commodity oilfield grade steel tubing 501 and is connected with a specialized tubing section 506. Turning now to FIG. 6, As shown in FIG. 6, each tubing collar is designed to not only hold the weight of one cell in a vertical position but will have two conductive paths through it to interface with the power cell end caps. The collar holds the weight of the individual cells contained within that piece of tubing but also a part of the structural component of the collective of all the connected strings of tubing.

Figure 7:
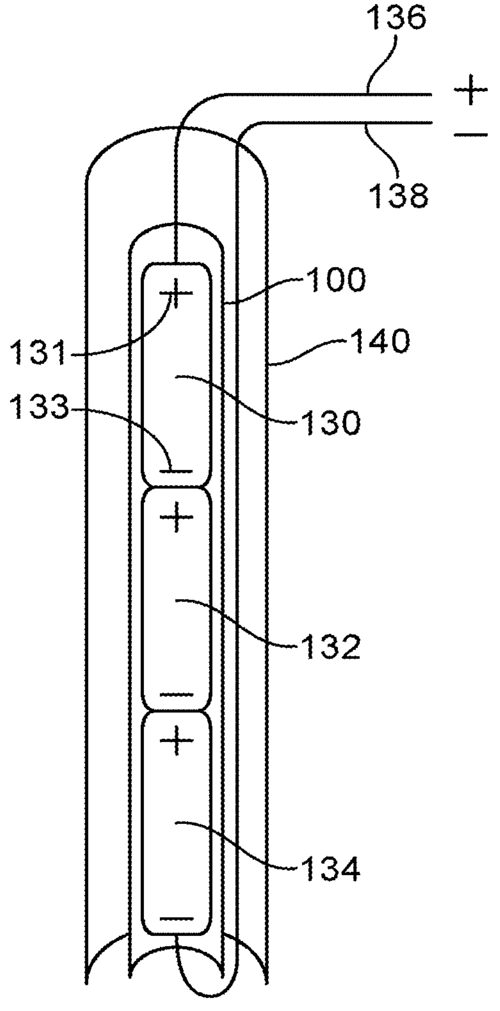
FIG. 7 depicts a side view of a cross section of a particular illustrative embodiment of the invention.

Turning now to FIG. 7, as shown in FIG. 7, battery cells 130, 132 and 134, each having a negative anode 133 end and a positive cathode 131 end are electrically connected in series to each other inside of tubing 100 in a wellbore 140 drilled in the earth in a subterranean environment. Electrical lead 138 is connected to negative anode 133 and an electrical lead 136 is connected to the positive cathode 131 of the borehole battery.

Figure 8:
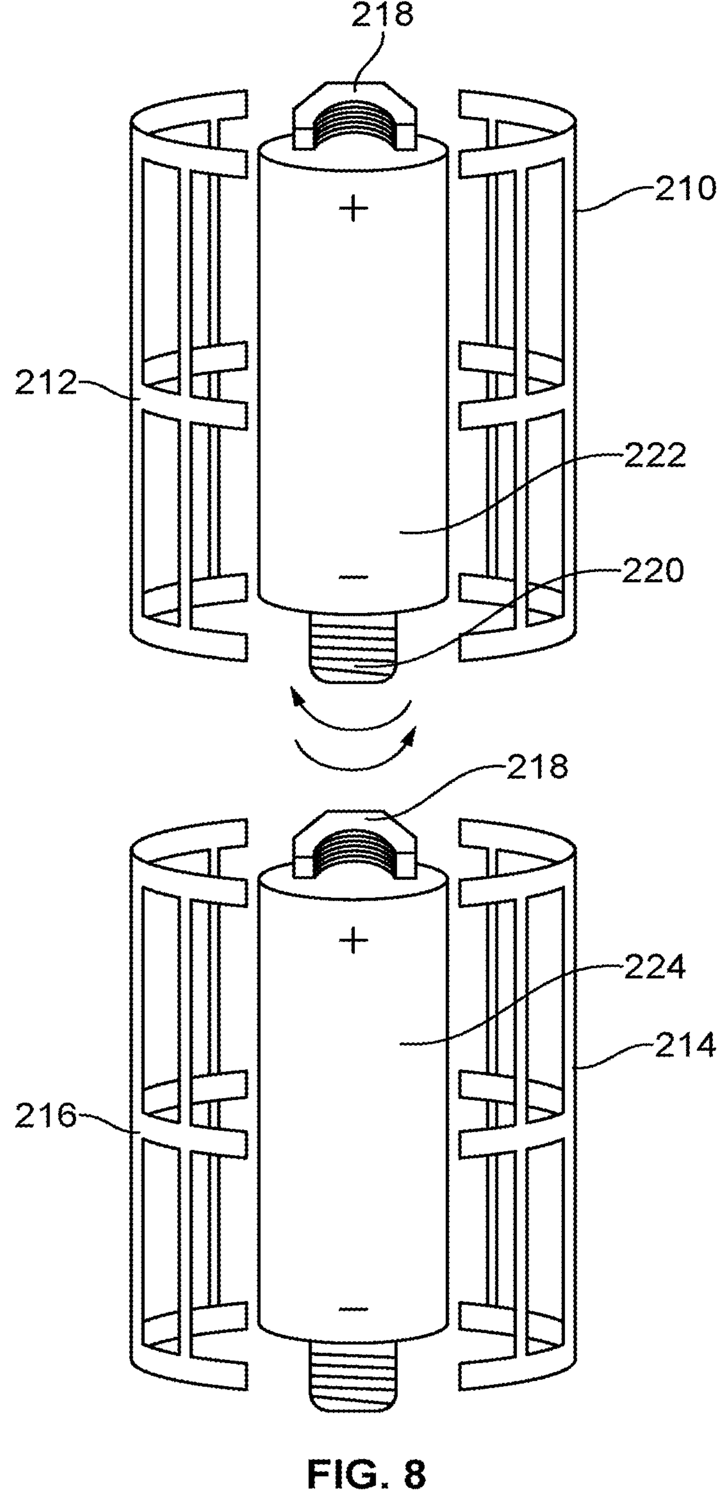
FIG. 8 depicts an exploded view of a particular illustrative embodiment of the invention.

Turning now to FIG. 8, as shown in FIG. 8, load bearing baskets 210 and 212 snap together around battery cell 222. Similarly load bearing baskets 214 and 216 snap together around battery cell 224. Each battery has a threaded female connector receptacle 218 and a threaded male connector 220. The threaded male connector 220 of battery cell 222 screws into the female threaded receptacle 218 of battery cell 224, forming a first section of the borehole battery. The battery cells are sliding into tubing 100 and deployed in a casing 101 into a wellbore 140.

Figure 9:
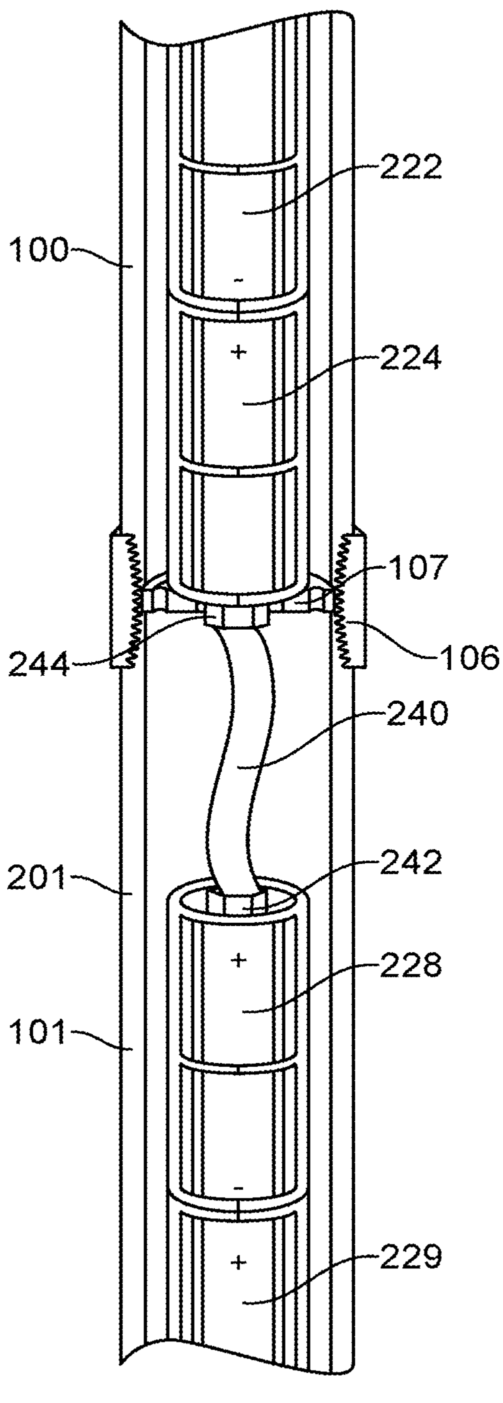
FIG. 9 depicts a side view of a cross section of a particular illustrative embodiment of the invention.

Turning now to FIG. 9, as shown in FIG. 9, battery cell 222 is connected to battery cell 224 inside of a first tubing section 100. A third battery cell 228 is connected to a fourth battery cell 229. The threaded male connector 220 of battery cell 229 screws into the female threaded receptacle 218 of battery cell 228, forming a second section of the borehole battery. A flexible electrical connector 240 is connected to the first battery section via connector 244 and to the second battery section via electrical connector 242.

Figure 10:
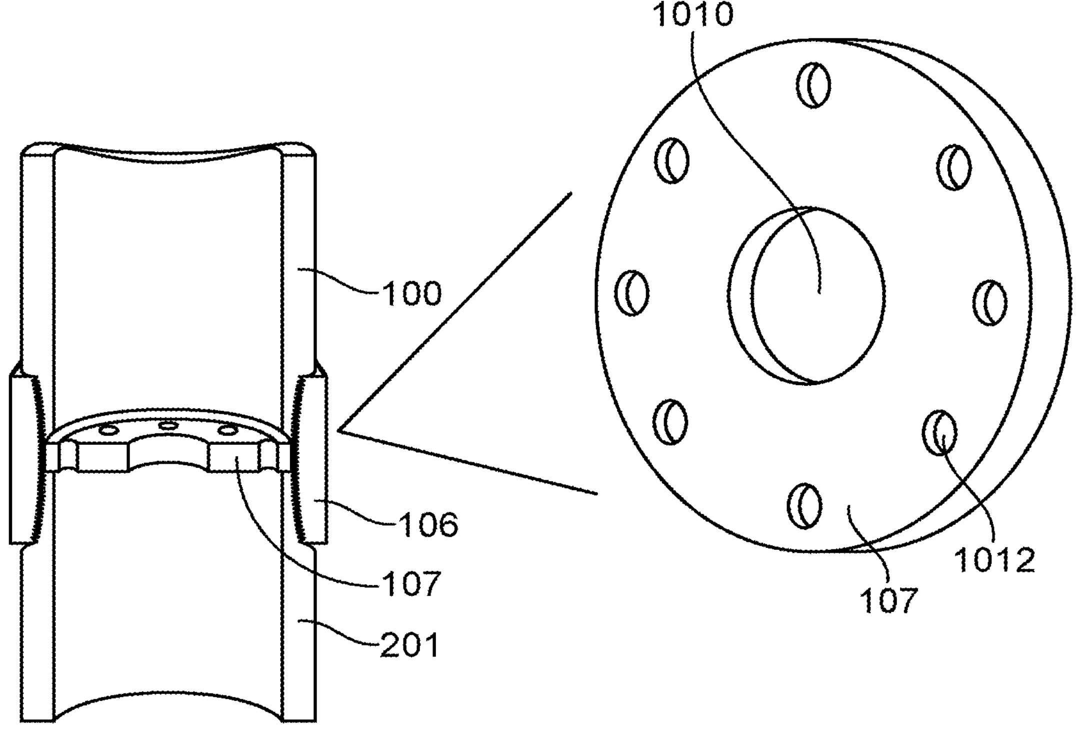
FIG. 10 depicts an exploded view of a particular illustrative embodiment of the invention.

Turning now to FIG. 10, as shown in FIG. 10, a steel plate 107 is inserted between the first tubing section 100 and a second tubing section 201. Steel plate 107 has 8 circumferential holes 1012 and a center hole 1010.

Figure 11:
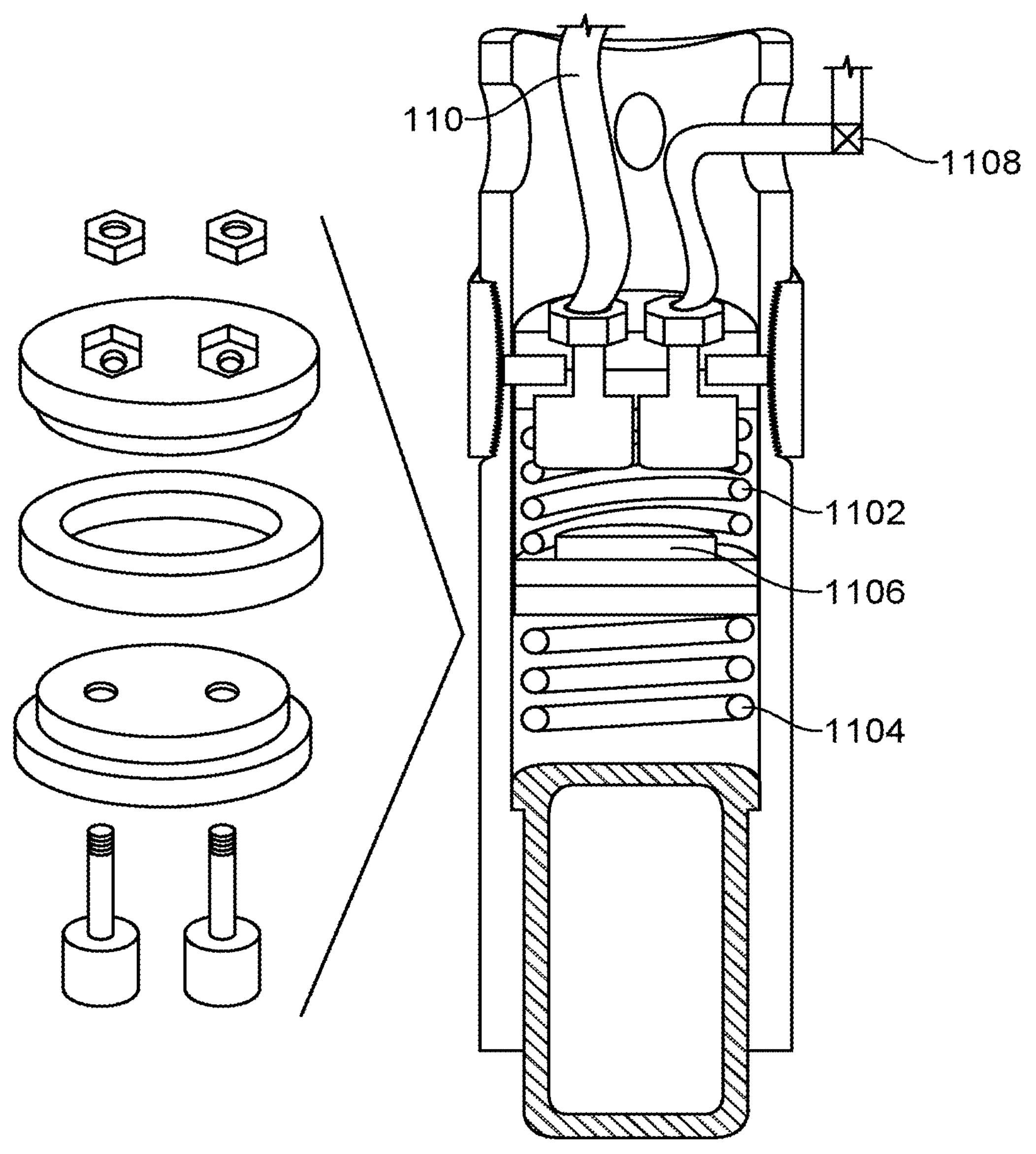
FIG. 11 depicts an exploded view of a particular illustrative embodiment of the invention.

Turning now to FIG. 11, as shown in FIG. 11, in a side cross-sectional view of a section of an illustrative embodiment of the invention. As shown in FIG. 11, a flexible connector 1110 connects the lower battery cell to a pressure activated safety switch at the bottom of the borehole battery portion. The safety switch is a safety feature that only engages when the battery cell assembly is landed on bottom. This ensures the return conductor is not live as the battery cells are lowered into and out of the recycled battery casing housing. The way the pressure switch works is, as weight is put on the switch, partial string weight is transmitted to the switch contact points which then energizes the circuit.

A lower spring 1104 limits the force so as to not ruin the switch. Because there is only so much stroke on the bottom button, the spring force is all the contact points will see. The tubing edge will bottom out on the "Battery Cell Activation Landing Support" 1805 in FIG. 18, before the button 1106 bottoms out against the conductive contact points. The upper spring 1102 makes sure the safety switch electrically disengages when the borehole battery is pulled out of the well. This is an added safety feature to make sure the battery return conductor wire is not live as the batteries are disassembled while coming out of the battery casing. To figure the force needed for each of the upper spring and bottom springs, bottom spring=desired force on contacts when compressed+upper spring force when compressed upper spring=desired spring force when compressed, (just needs to be enough to make sure the switch deactivates when the string containing various internal components of the borehole battery is picked up and lifted out of the wellbore).

In another particular illustrative embodiment of the invention, the system and method repurpose jointed tubulars. Historically these jointed tubulars are used to aid in the circulation and flow of wellbore fluids in the wellbore. In another particular illustrative embodiment of the invention, the system and method convert the jointed tubulars for use as a battery housing when constructing a battery bank. The jointed tubulars are repurposed as a mechanism for connecting battery banks together in series in the wellbore.

Figure 12:
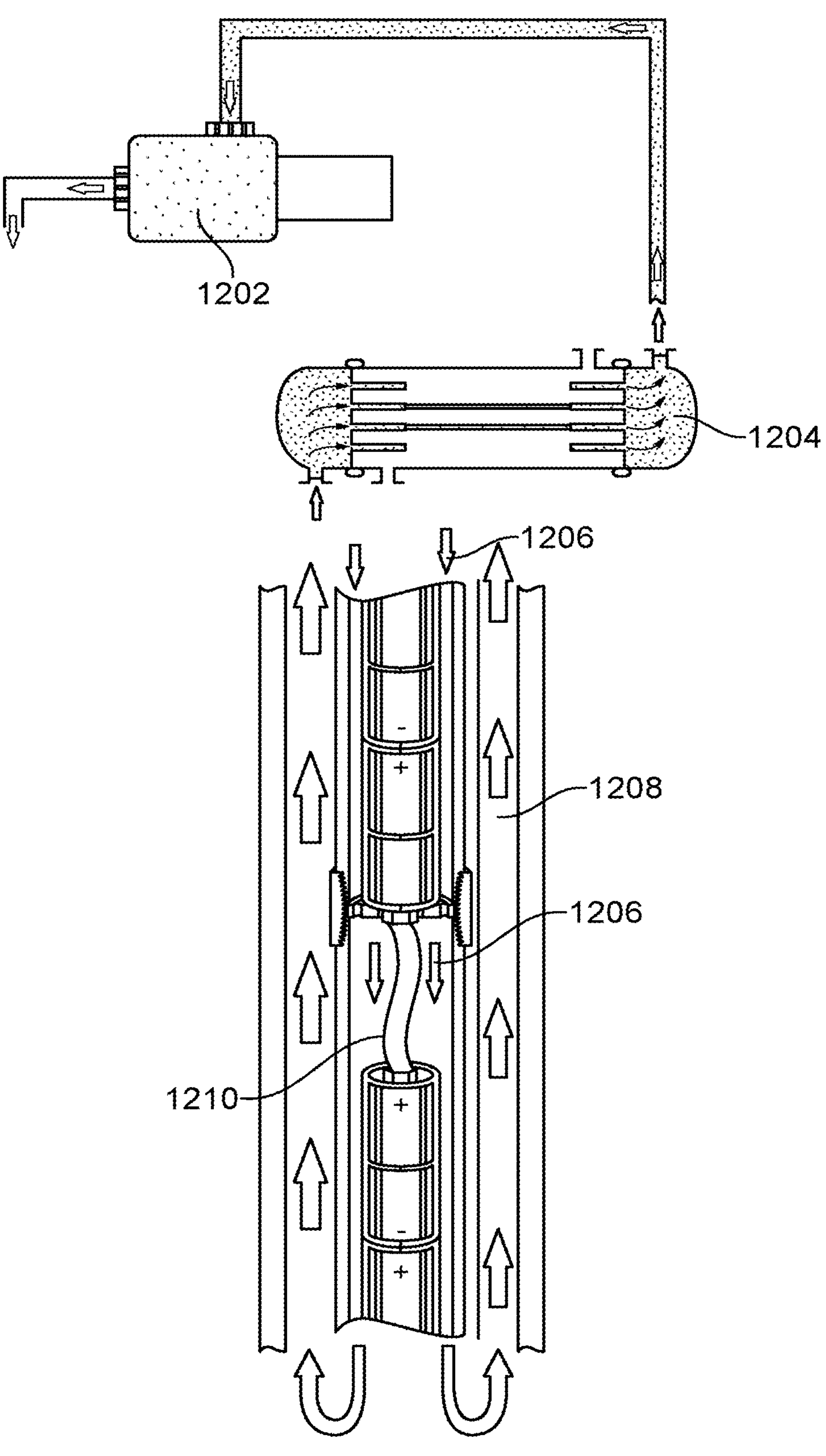
FIG. 12 depicts an exploded view of a particular illustrative embodiment of the invention.

Turning now to FIG. 12, in a particular illustrative embodiment of the invention, a cooling medium pump 1202 and heat exchanger 1204 are provided to pump a cooling medium, such as water or air or another cooling gas. The cooling medium is pumped into the borehole battery in downward flow path 1206 through an inner annulus formed between the battery cell and basket and an interior surface of the tubing 100, wherein the cooling medium flows through the inner annulus across the borehole battery cells throughout the borehole battery and returns through the outer annulus in flow path 1208 formed between the exterior surface of the tubing 100 and the interior surface of casing 101, to the heat exchanger where the cooling medium is cooled and returned to the pump 1202 for recirculating through the borehole battery. Casing 101 is inserted into a sealed interval of the wellbore 140. Power is provided to the surface of the wellbore (e.g., above the wellbore 140 of FIG. 18.

Figure 13:
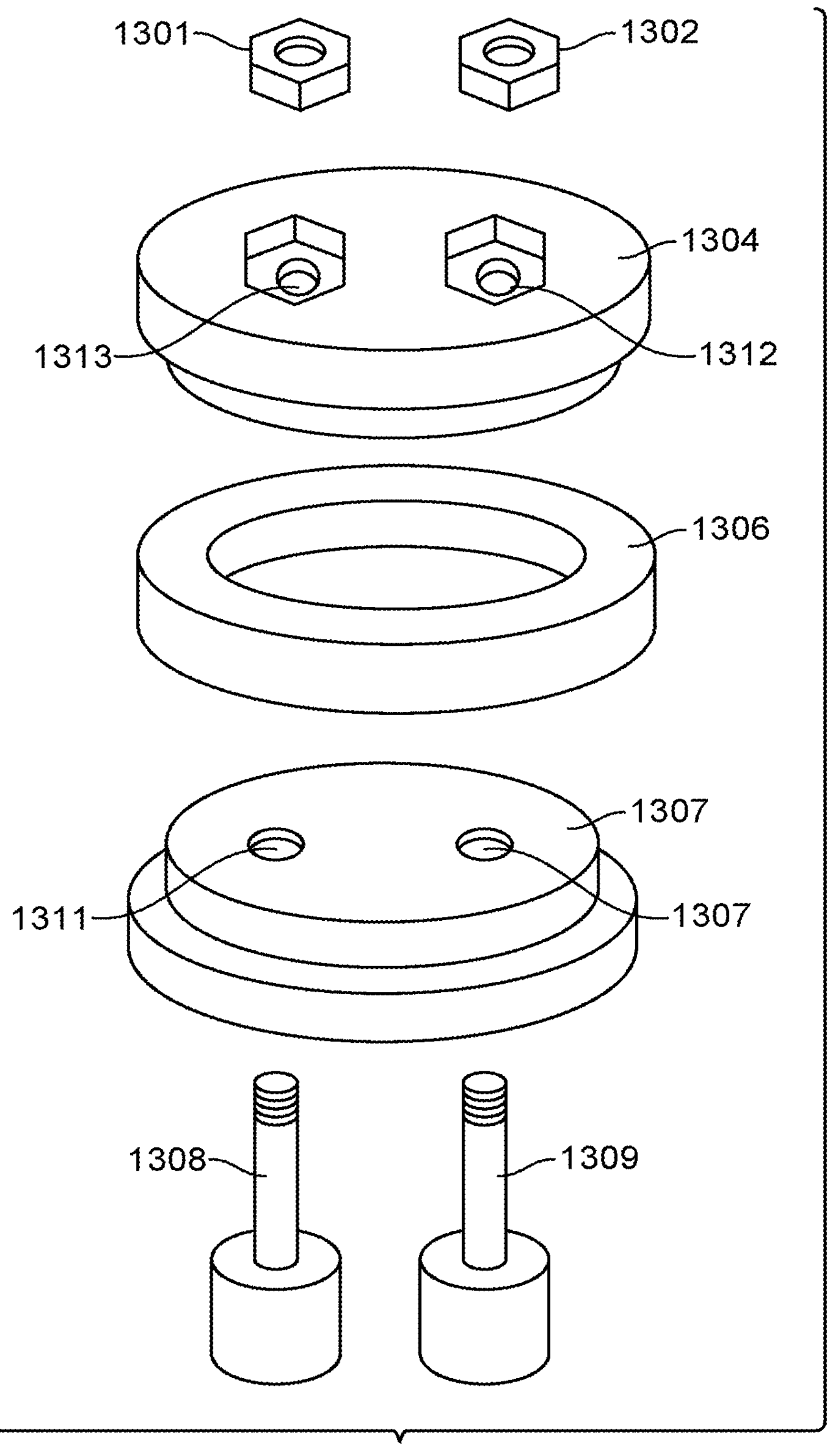
FIG. 13 depicts an exploded view of a particular illustrative embodiment of the invention.

Turning now to FIG. 13, as shown in FIG. 13, in a particular illustrative embodiment of the invention two threaded fasteners 1301 and 1302 fit into a first dielectric insulator 1304. First dielectric insulator 1304 fit into a top of steel ring 1306. Second dielectric insulator 1307 fit into a bottom of steel ring 1306. Conductive lugs 1308 and 1309 fit through holes 1311 and 1310 in second dielectric insulator 1307 and holes 1313 and 1312 in first dielectric insulator and are threaded into threaded fasteners 1301 and 1302.

Figure 14:
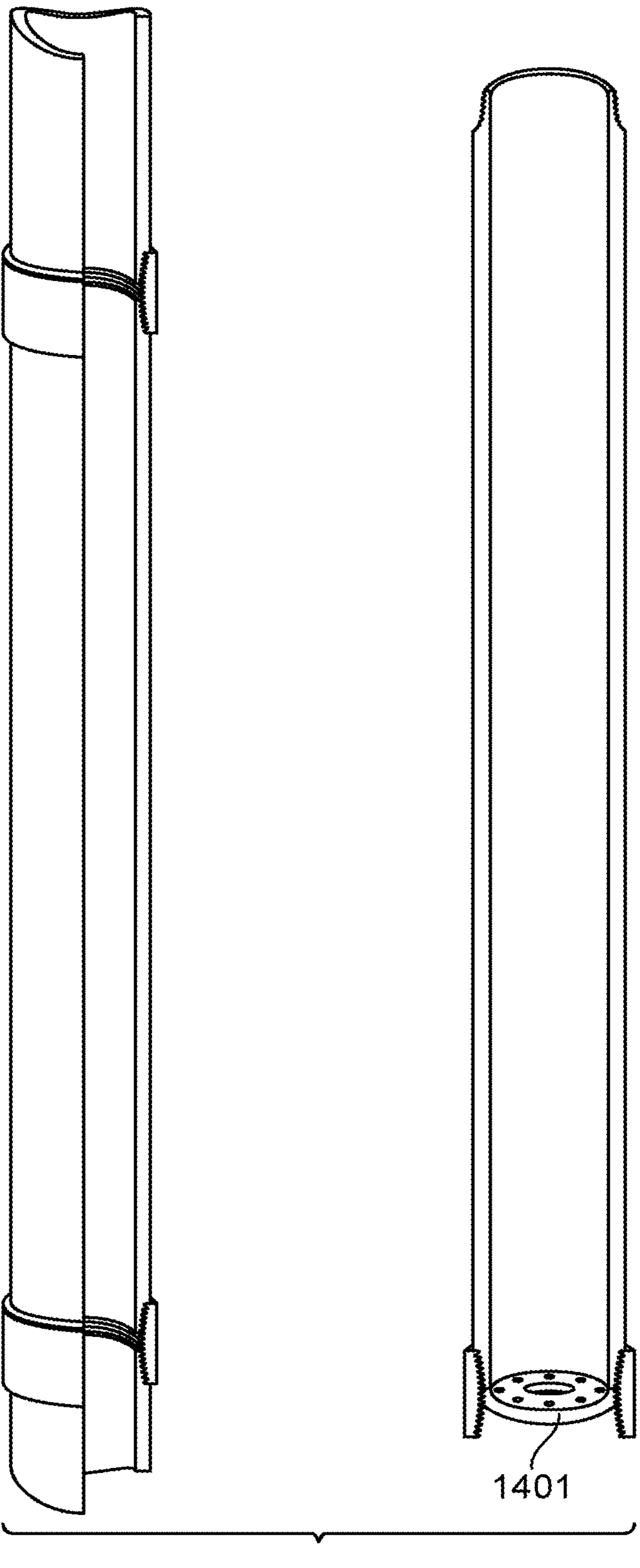
FIG. 14 depicts a side view of a cross section of a particular illustrative embodiment of the invention.

Turning now to FIG. 14, in a particular illustrative embodiment of the invention, a jointed tubing is connected to the borehole battery. The battery cell tubing (the tubing containing the battery cells) is connected to another section of tubing using a threaded battery cell tubing connector.

Figure 15:
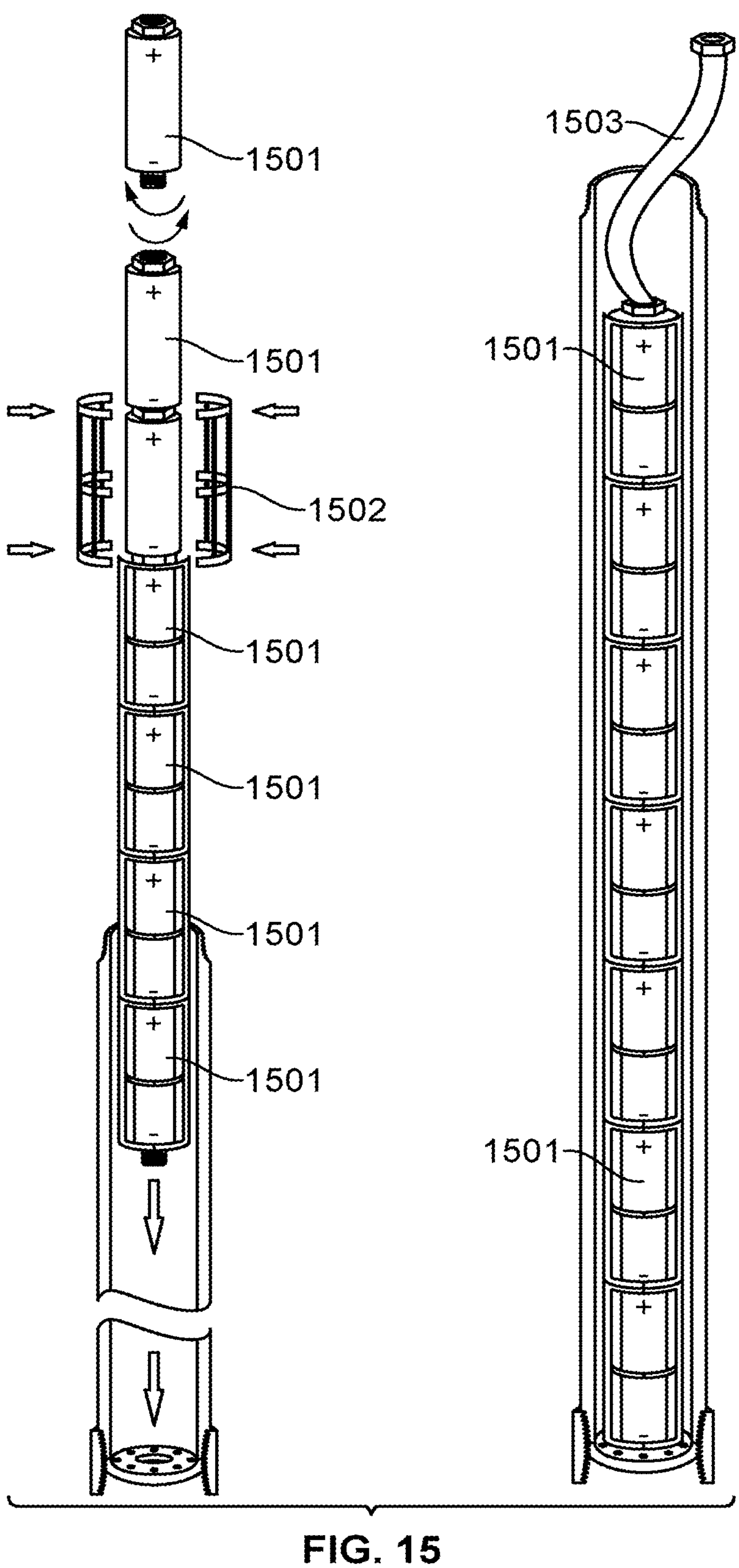
FIG. 15 depicts a side view of a cross section of a particular illustrative embodiment of the invention.

Turning now to FIG. 15, in a particular illustrative embodiment of the invention, battery cells 1501 are screwed together to provide the multiple connected battery cells that make up the borehole battery. Load bearing baskets 1502 are snapped together to protect the battery cells 1501 and to provide the cooling path for the cooling medium that is pumped down into the borehole battery. A flexible connect pigtail provides an electrical connection to the top of the borehole battery made up of the multiple battery cells. At the surface of the wellbore, a flexible connector connects to the top of the borehole battery and provides access to electricity to surface equipment, such as a residence for heating and cooling.

Figure 16:
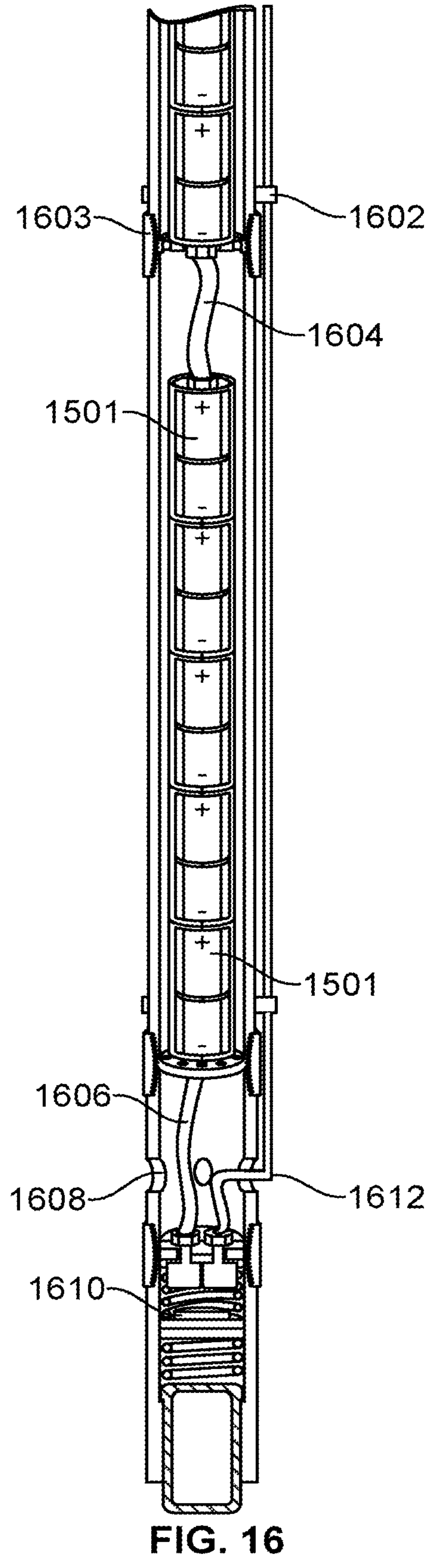
FIG. 16 depicts a side view of a cross section of a particular illustrative embodiment of the invention.

Turning now to FIG. 16, in a particular illustrative embodiment of the invention, as shown in FIG. 16, groups of battery cells 1501 contained within a single tubing section are joined together using a connector 1603. Each group of battery cells within a single tubing section are electrically connected with a flexible pigtail 1604. A bottom section of tubing containing a group of battery cells 1501 are connected to the pressure activated switch 1610. A plurality of cooling medium circulation holes 1608 provides a return path for the cooling medium after it passes down through casing sections past the battery cells. The cooling medium returns to the surface to the heat exchanger where it is cooled and recycles by the cooling pump. An electrical connection return conductor wire 1612 is connected to the pressure activated switch. The return conductor wire 1612 is banded to the external surface of the casing sections. The pressure activated switch is normally held in an open circuit position by the upper spring. When the weight of the battery is placed on the retainer, the upper spring is compressed, and the pressure activated switch is placed in a closed-circuit position. This way the battery is not energized until the battery is in place on the retainer.

Figure 17:
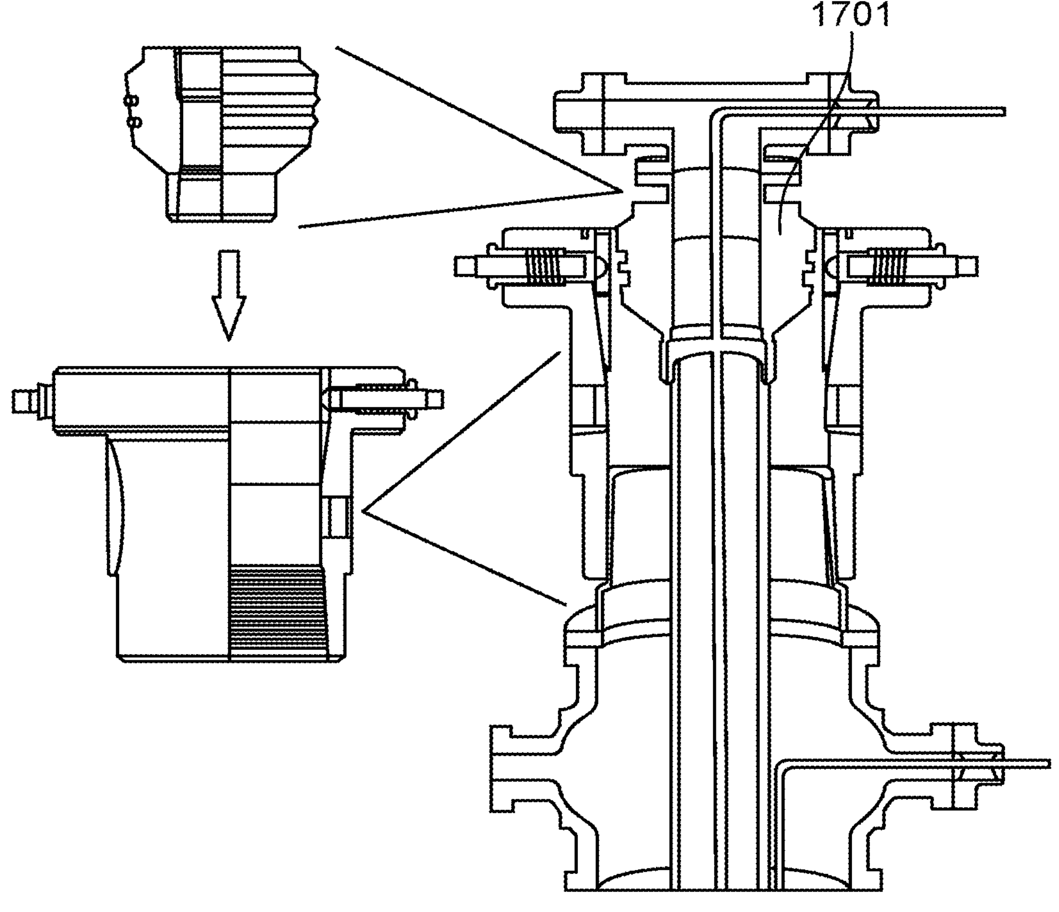
FIG. 17 depicts a side view of a cross section of a particular illustrative embodiment of the invention.
Figure 18:
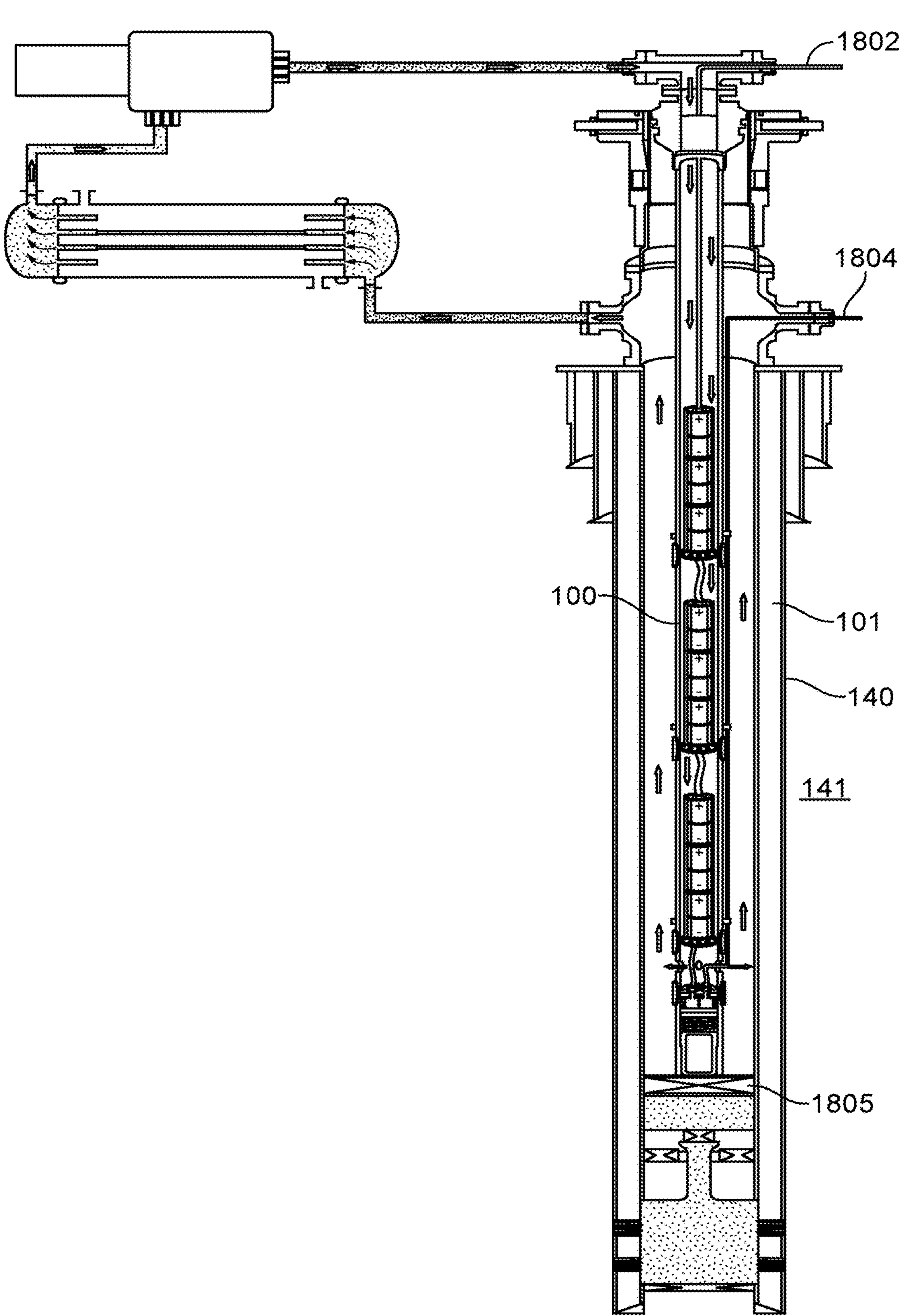
FIG. 18 depicts a side view of a cross section of a particular illustrative embodiment of the invention.

Turning now to FIG. 17, in a particular illustrative embodiment of the invention, the borehole battery is installed in tubing and suspended from a tubing hanger 1701. Turning now to FIG. 18, in a particular illustrative embodiment of the invention, a conductor 1802 is provided from the top cathode of the borehole battery at the uppermost battery cell group. Conductor 1804 connects the anode side of the borehole battery to surface equipment on the surface above the wellbore 140 drilled into the Earth 141. The wellbore battery rests on a retainer 1805.

Figure 19:
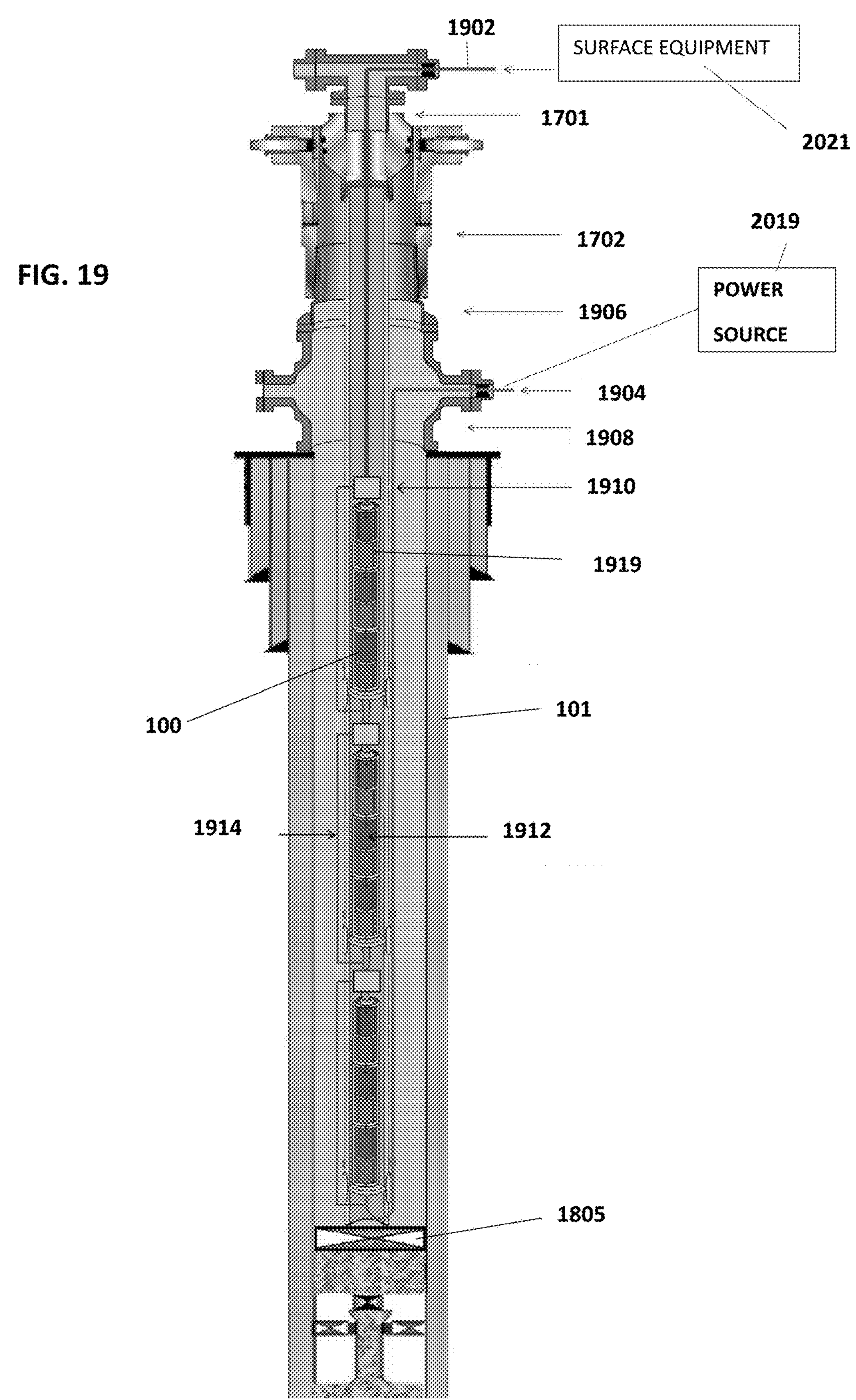
FIG. 19 is a side view schematic depiction of a particular illustrative embodiment of the invention.

Turning now to FIG. 19, FIG. 19 is a schematic depiction of a particular illustrative embodiment of the invention as a subterranean power storage system. As shown in FIG. 19, a power source 2019 is provided to provide charging energy to the rechargeable energy cells. The power source 2019 can be configured to supply energy from multiple types of power supply sources such as an electrical grid, diesel generators, gasoline generators, windmills, solar grids and any other available existing or future energy power supply available. As shown in FIG. 19, a conductor to surface equipment 1902 is provided for supplying power on demand to the surface equipment 2021. The surface equipment is any device or system that requires power, including but not limited to a power grid, residential housing, industrial equipment, and any other electrical system or device requiring electrical power on demand from the subterranean power storage system. A tubing hanger 1701 is provided as support for tubing section 100 connected together with other tubing sections to form a tubing string suspended from the tubing hanger 1701. The tubing string is deployed downhole in the housing (wellbore) inside of the borehole sealing casing 101. A tubing head 1702, flange 1906 and flow cross 1908 are provided as part of a support structure for the tubing string. An electrical conductor 1904 is provided to connect the power source 2019 to the rechargeable power cells 1912 for charging the rechargeable power cells 1919. In a particular illustrative embodiment of the invention the rechargeable power cells is a capacitor. A power management system and circuit bypass 1910 is provided between the charging cable 1804 and power extraction cable 1902 whose operation is further explained below in connection with FIG. 20 and FIG. 21. A bypass circuit wire 1914 is provided to bypass the extraction of power from the power storage cells and charging of the power storage cells.

Figure 20:
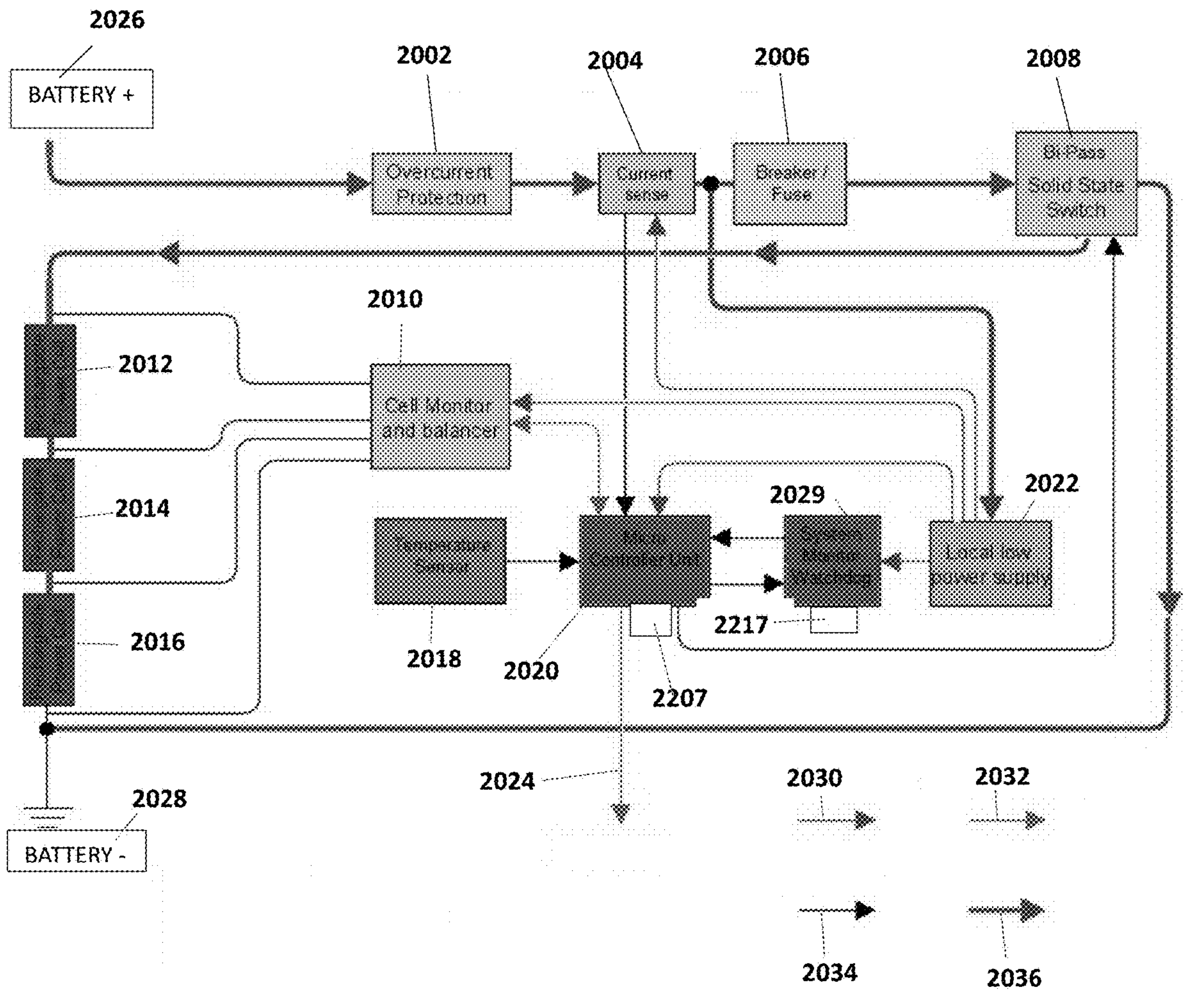
FIG. 20 is a side view schematic depiction of a particular illustrative embodiment of the invention.

Turning now to FIG. 20, FIG. 20 is a schematic depiction of the power management system (hereinafter "PMS"). The PMS is configured to have an over current protection circuit 2002, current sensing 2004, breaker fuse 2006 and a bypass solid state switch. The rechargeable energy storage cells 2012, 2014 and 2016 are connected to a storage cell monitor and cell balancer 2010. A temperature sensor 2018, a first processor 2020 acting as a micro controller processor including a first non-transitory computer readable medium 2207. A computer program made up of instructions that are executed by the first processor 2020 is stored on the non-transitory computer readable medium 2207. A second processor 2029 acts as a system monitor watch dog, the second processor 2029 including a non-transitory computer readable medium 2217. A computer program made up of instructions that are executed by the second processor 2029 is stored on the second non-transitory computer readable medium 2207. A local low power supply 2022 is provided to power the first processor 2020 and the second processor 2029. A data line out 2024 is provided to send data from the first processor. A battery 2026 is provided to power the PMS.

Low voltage line 2030, provides a compatible power source of appropriate voltage to the circuitry for operation. Data bus line 2032—is a signal line for exchanging data between the processor and the other circuitry components. Control line 2034—enables the transmission of signals, allow data acquisition, and permits control and activation of instrumentation. Battery voltage line 2036—is a voltage provided by the rechargeable power cells as seen in the circuit. This is what is being managed by the power management system.

Figure 21:
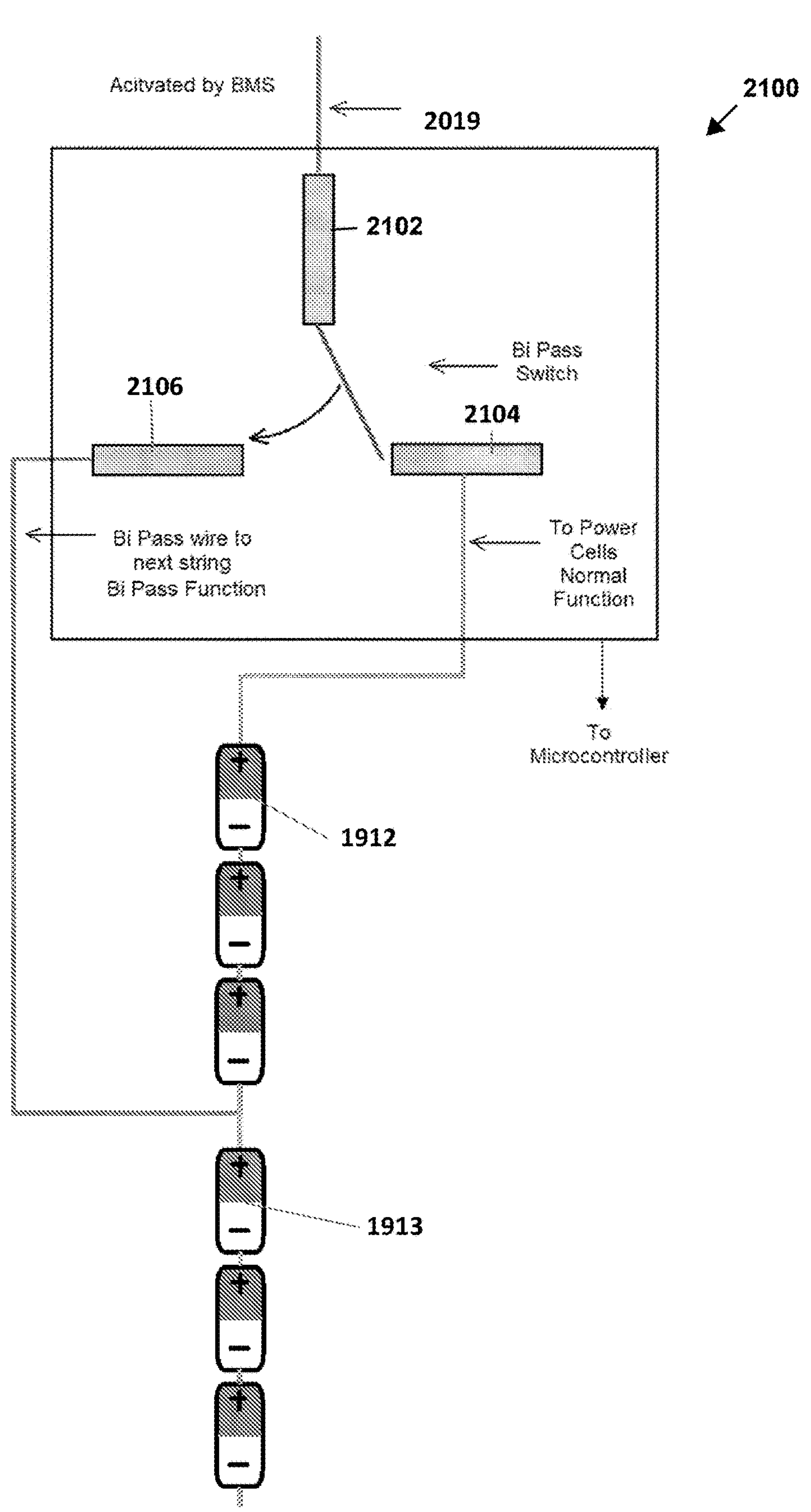
FIG. 21 is a side view schematic depiction of a particular illustrative embodiment of the invention.

Turning now to FIG. 21, FIG. 21 is a schematic depiction 2100 of a particular illustrative embodiment of the invention, a bypass switch that is activated by the PMS. The first processor in the PMS control activation and deactivation of the bypass switch 2100. In a first instance the first processor places the bypass switch element 2102 so that element 2102 is connected to bypass switch element 2104 for normal operation connecting a first group of rechargeable storage cells 1912 to power source 2019 through switch element 2104 for charging the rechargeable storage cells 1912 and the second group of rechargeable cells 1913. In a second instance the first processor moves the places the bypass switch element 2102 so that it is connected to bypass switch element 2106 for bypass operation thereby disconnecting the first group of rechargeable storage cells 1912 from the power source 2019 through switch element 2104, bypassing the first group of rechargeable cells from the power source 2019 and connects switch element 2102 to switch element 2106 for charging the rechargeable storage cells 1912. As the cells are monitored by the power management system, when the cells that are discharging too fast, they are shut off via the bypass. As other cells catch up, the bypassed cells are reintegrated into the discharge circuit by the PMS. As this takes place, the current and voltage of the overall system are affected.

In another particular embodiment of the invention, the energy storage cell placed in the housing is a battery of any type that stores energy and does not require active cooling but instead uses the housing to conduct heat to the reservoir.

In another particular illustrative embodiment of the invention, the system and method are used to repurpose a wellhead tubing hanger. Historically wellhead tubing hangers are used to hang off tubing for hydrocarbon flow from a wellhead. In a particular illustrative embodiment of the invention, the system and method the wellhead tubing hanger is repurposed to hang off storage batteries, battery connectors, battery safety switches, and power lines from the converted well.

In a particular illustrative embodiment of the invention, the system and method are integrated with an existing electrical grid currently used for one way distribution at the well site and converted to both input and output of electricity. In a particular illustrative embodiment of the invention, a workover rig is used to install these batteries, whereas the workover rig would traditionally be used to uninstall and reinstall tubing used to circulate and extract hydrocarbons.

In a particular illustrative embodiment of the invention, the system and method create a new use for a post plugged and abandoned wellbore. Moreover, the system and method repurpose existing resources to fulfill a new unintended use. The system and method repurpose a wellbore, tubing, field footprint and the electric grid.

In a particular illustrative embodiment of the invention, the system and method produce a cheaper way to store electron energy in batteries. The system and method create a safer grid that is less accessible and thus provides an inherent deterrent to provide a terrorism defense. The system and method also provide environmental protection, wherein if a battery leaks, it leaks into a sealed environment within the wellbore, sealed inside tubing, inside the wellbore casing, sealed inside cement, inside another layer of casing and cement downhole in the wellbore. In a particular illustrative embodiment of the invention, the system and method help stabilize energy demand associated with renewable resources and provide current oil and gas producers a way to diversify away from their hydrocarbon collection.

In a particular illustrative embodiment of the invention, the system and method are used as in the following example. Initially the system and method of the present invention are used to prepare the wellbore for conversion into a borehole battery. An obsolete hydrocarbon wellbore is earmarked for conversion. The earmarked wellbore is then evacuated of all production equipment and abandoned as per state/federal guidelines to a depth that would be adequate for conversion, usually around 5,000'. This process is completed with an oil and gas workover rig. Evacuated components are disposed of as per regulatory guidelines. A combination cement and bridge plug/cement retainer are installed at the new plugged back total depth. A pressure integrity test is performed on the newly plugged back wellbore to verify wellbore integrity. A bridge plug is installed that is adequate for setting down weight on top of the cement retainer. A workover string is installed into the wellbore, tagging the bottom for wellbore fluid evacuation. Nitrogen or air is pumped into the wellbore to evacuate the wellbore fluid and blow dry the wellbore as practical. The workover string is removed.

In a particular illustrative embodiment of the invention, the system and method are used to build the battery of multiple connected battery cells or battery bank sticks, also referred to herein as battery sticks, which are formed by a plurality of battery cells joined together physically and electrically. Battery sticks of the appropriate length, outside diameter, voltage, and capacity are manufactured off site through a 3$^{rd}$ party contractor. Battery sticks are manufactured with positive engagement endcaps, so as to be securely fastened together end to end, (example: such as thread together connectors).

Cells are attached end to end in a series or parallel configuration to match a joint of tubing, (ex: 10', 15', 40', etc.). Plastic stabilizing baskets or cages 210, 212, 214 and 216 are provided which encapsulate each cell in order to provide axial & radial stress support, to allow return cooling medium and air flow around the battery cells, and to protect the cell connectors from shock forces. The cells can be shrink wrapped together with electrically insulating heat shrink for stability and ease of installation. The cells are pushed into each joint of tubing, leaving approximately a foot of space at the up-hole side of the tubing.

The tubing connectors provide a combination of tubing-to-tubing connectivity, vertical battery weight support, string ventilation, and battery connectivity from tubing string to tubing string. A down hole end of the tubing uses a flexible connector that incorporates a screw in style connection piece to link battery connectivity across the tubing connections. An up-hole end of the tubing use the same flexible connector. A flexible pig tail is provided that threads through the tubing connector so as to allow the battery bank sticks to connect together before the battery sticks are screwed together with the tubing collar. This flexible pig tail will secondarily allow for tubing stretch and thermal expansion of the tubing during installation and service life.

In a particular illustrative embodiment of the invention, the system and method provide a Secondary Battery Cooling line. Air is circulated by pumping through the battery sticks, and across each individual battery to cool the batteries while in use. This process is part of the design facilitated via the ventilated tubing collar connector plates. Air is circulated either down the tubing and up the annular space, or vice versa. If the wellbore annular space is required to be sealed from the tubing ID, (ex: flooded wellbore), a secondary cooling line can be installed into the bottom pressure switch connector. This secondary cooling line will be used to circulate air or a dielectric cooling fluid across the battery tubing body for cooling. Install an approximately 1-inch capillary line, or jointed tubing is installed into the wellbore. This secondary cooling line installed during the primary installation of the battery string and should be banded to the tubing along with the return conductor wire.

In a particular illustrative embodiment of the invention, the tubing connectors are a cylindrical plate of steel 107 that is sandwiched between the tubing joints 100, 201, (501, 506), inside the tubing connection collar. Cylindrical plate 107 has a hole 1010 in the middle to accommodate the flexible pig tail connector, and holes 1012 on the perimeter to accommodate forced air circulation for cooling. The cylindrical plate is manufactured with an insulative, rubberized coating.

In a particular illustrative embodiment of the invention, battery bank sticks made up of multiple connected battery cells, are installed in preferably 40' intervals maximum, lowering the battery sticks into the wellbore in series to rest on the retainer that sits at the well's plugged back depth. The bottom has an electrical connector 1108 that fits an external line to be strapped to the outside of the tubing and run to surface. The bottom has a pressure activated switch to energize the system when the set down weight is achieved. The system and method are used to attach the landing pup to the bottom joint, over the electrical connector.

In a particular illustrative embodiment of the invention, the system and method are used to make up each joint. While making up each joint, each joint is preferably verified with a multimeter for electrical integrity. The joints arrive with the batteries preinstalled with the down hole connection made up and ready. The up-hole connection has a flexible pigtail connector 1110 that should not need to be pre-rotated before installation. The number of turns to connect the inner connection should be the same number of turns for the outer connection in the opposite direction, leaving the pigtail in a neutral position after installation.

In a particular illustrative embodiment of the invention, each battery stick will have an external banding point for the external electrical wire ran to surface. Do not damage the electrical insulation of the wire. A pup joint is provided as a final termination joint to finalize and space out the final set down weight on the bottom hole retainer. A pup joint is a short casing or tubing used for handling production tubing assemblies and for spacing out full length tubing and casing strings. The system and method are used to set/install a tubing hanger wellhead assembly to hang off the battery bank. The system and method are used to space out and connect the electrical connection to the surface equipment, utilizing a high voltage disconnect switch. Ensure the switch is disengaged. The system and method are used to hang tubing in the wellhead from the tubing hanger. The final set down weight of the tubing is determined to minimize tubing stretch while allowing for thermal expansion. As set down weight is achieved, the bottom hole switch is activated and the battery pack circuit is energized and live, ready to supply electrical power to a surface user, such as a home.

In a subterranean environment, electrical energy is converted to chemical energy through the flow of electrons from one electrode to another through an external subterranean circuit. The chemical energy is stored and converted back to electrical energy as needed for surface use. The system and method are used to transfer power into the subterranean cells so as to charge the batteries through a surface connection and power source; store power for a period of time; extract power as required to the surface through the use of power transformers or other surface equipment connected to surface transmission lines.

In a particular illustrative embodiment of the invention, battery cells in a wellbore can be wired in series, parallel, or a combination thereof. Consider the following, an example wellbore to be converted to battery bank storage: Wellbore: Casing: 7"OD, 6.276"ID, 5,600' deep; Battery string: Host Install Tubing: 3½"OD, 2.992"ID; Tubing connection: 5" OD, 1' long battery cells, 5,600 batteries total. In a particular illustrative embodiment of the invention, the batteries are lithium technology, 3.6V each, 20,160V total system, 3.25" OD batteries, yields a theoretical 1,730 kWh. This is enough to power the average house for almost 2 months. In a particular illustrative embodiment of the invention, a return conductor wire is provided which is a commodity "highline grade" aluminum alloy, OD: 0.5" and adequate for ~1,200 amps at 20,160 V.

In a particular illustrative embodiment of the invention, clearances are maintained as follows: Wellbore ID: 6.276" ID, Tubing connector: 5" OD, Return wire: 0.5" OD, Battery Assembly OD=Tubing connector+Return wire=5.5"OD, Wellbore-battery installation clearance=6.276"−5.5"=0.776" of install clearance. In a particular illustrative embodiment of the invention, casing integrity calculations are used, wherein in the wellbore that is to be evacuated, a collapse pressure of casing needs to be higher than the hydrostatic pore pressure of the formation, hydrostatic pressure differential at plug back total depth: 0.052×5,600'×8.34 ppg=2,429 psi. A casing Collapse Pressure Limit, 7" 26 #N-80 casing=5,410 psi.

In a particular illustrative embodiment of the invention, a subterranean energy storage and retrieval system is disclosed, the system includes but is not limited to, a wellbore; battery cells placed in the wellbore; and an electrical connection attached to the battery cells at a surface of the wellbore. In another particular illustrative of the invention, the subterranean energy storage and retrieval system the battery is a plurality of battery cells. In another particular illustrative of the invention, the subterranean energy storage and retrieval system further includes but not limited to a cooling system that circulates a cooling medium to and from the battery downhole.

In another particular illustrative of the invention, the subterranean energy storage and retrieval system further includes but not limited to an inner annulus formed between an outer surface of the battery cells and an inside surface of a tubing string, wherein the inner annulus provides a flow path for cooling medium circulated by a cooling pump. In another particular illustrative of the invention, the subterranean energy storage and retrieval system further includes but not limited to a wellbore casing, wherein the battery cells are placed inside of the wellbore casing; and an outer annulus formed between an outer surface of the battery cell tubing string and an inside surface of the wellbore casing, wherein the annulus provides a flow path for cooling medium circulated by the cooling pump.

In another particular illustrative of the invention, the subterranean energy storage and retrieval system further includes but not limited to a length of tubing placed in the wellbore, wherein the battery cells are placed in the tubing, wherein an outer annulus is formed between an outside diameter of the tubing and an Inside diameter of a wellbore casing and an inner annulus is formed vertically around a battery cell outside surface and the inside surface of the tubing, wherein the cooling system pumps the cooling medium downhole through the inner annulus to the batteries and the cooling medium returns through the outer annulus.

In another particular illustrative of the invention, the subterranean energy storage and retrieval system further includes but not limited to a pressure activated switch attached to a bottom of the battery; and an upper spring, wherein the pressure activated switch is held in an open circuit position by the upper spring, wherein the upper spring makes sure the pressure activated switch disengages when the battery is pulled out of the wellbore causing a weight of the battery to be removed from the upper spring in the pressure activated switch, wherein the switch is engaged to a closed position when the upper spring is compressed by a weight of the battery when the battery is lowered onto a retainer in the wellbore compressing the upper spring. In another particular illustrative of the invention, the subterranean energy storage and retrieval system further includes but not limited to a lower spring placed between the upper spring and the retainer, wherein a combination of forces of the upper spring and the lower spring limits the force on the pressure activated switch. In another particular illustrative of the invention, the subterranean energy storage and retrieval system further includes but is not limited to a polymer shell surrounding the battery.

In another particular illustrative of the invention, the subterranean energy storage and retrieval system further includes but not limited to a plurality of end cap connectors on each end of each battery cell, wherein the battery cells are connected electrically to each other through the end cap connectors; and a threaded end cap connector wherein adjacent end caps mechanically fastened to each other using the threaded end cap connectors. In another particular illustrative of the invention, the subterranean energy storage and retrieval system further includes but not limited to a load bearing basket surrounding the battery cells, wherein the load bearing baskets snap together around the battery cells and provide a cooling medium flow path around the battery cells. In another particular illustrative of the invention, the subterranean energy storage and retrieval system further includes but not limited to a cylindrical tubing connection that connects the battery to a tubing section, wherein a cylindrical tubing connector has a middle hole for an electrical connection and a plurality perimeter holds for a cooling medium path. In another particular illustrative of the invention, the subterranean energy storage and retrieval system further includes but not limited to holes in the pressure activated switch that provide a return flow path for the cooling medium.

In another particular illustrative of the invention, the subterranean energy storage and retrieval system further includes but not limited to a wellbore; a sealed interval in the wellbore; a tubing, wherein a battery cell is placed inside the tubing in the sealed interval in the wellbore; a casing, wherein the tubing is place inside of the casing in the sealed interval in the wellbore; and an electrical connection attached to the battery at a surface of the wellbore. In another particular illustrative of the invention, the subterranean energy storage and retrieval system further includes but not limited to a cooling system that circulates a cooling medium to cool the battery; and a flow path for the cooling medium that enables the cooling system to pump the cooling medium across the battery and return to the surface.

In another particular illustrative of the invention, the subterranean energy storage and retrieval system further includes but not limited to an inner annulus formed between an exterior surface of the battery cells and the inner surface of the tubing; and an outer annulus formed between an outside of the tubing and an inside diameter of the casing, wherein the cooling system circulates a cooling medium from a surface of the wellbore through the inner annulus, wherein the flow path is formed by the inner annulus and the outer annulus. In another particular illustrative of the invention, the subterranean energy storage and retrieval system further includes but not limited to a bottom hole retainer in the wellbore; and a pressure activated switch at a bottom of the tubing, wherein the pressure activated switch is disengaged until the tubing final set down weight is resting on the bottom hole retainer.

In another particular illustrative of the invention, the subterranean energy storage and retrieval system further includes but not limited to a sealed interval in the wellbore, wherein battery cells are placed within the sealed interval. In another particular illustrative of the invention, the subterranean energy storage and retrieval system further includes but not limited to a method, the method including but not limited to sealing an interval in a wellbore; placing borehole battery cells within the sealed interval in a wellbore; activating a pressure activated switch tubing string battery cell assembly using the weight of the string to activate the pressure activated switch; and extracting electrical energy from the battery at a surface of the wellbore. In another particular illustrative of the invention, the subterranean energy storage and retrieval system further includes but not limited to circulating a cooling medium through an inner and outer annulus flow path to flow the cooling medium past the battery.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that is issued therefrom.

The invention claimed is:

1. A subterranean energy storage and retrieval system, the system comprising:

a wellbore including a wellbore casing and a hydraulic seal disposed within the wellbore casing to form a sealed interval of the wellbore;

an energy storage cell disposed in the wellbore casing within the sealed interval of the wellbore; and an electrical connection extending from the energy storage cell to a surface of the wellbore.

2. The subterranean energy storage and retrieval system of claim 1, wherein the energy storage cell is a capacitor.

3. The subterranean energy storage and retrieval system of claim 1 wherein the energy storage cell is a plurality of rechargeable energy storage cells, the subterranean energy storage and retrieval system further comprising:

a bypass circuit configured to selectively connect a subset of the plurality of rechargeable energy storage cells to the electrical connection.

4. The subterranean energy storage and retrieval system of claim 3, further comprising:

a processor;

a non-transitory computer readable medium on the processor;

a computer program comprising computer instructions executed by the processor, computer program comprising:

instructions to place the bypass circuit in a first position in the bypass circuit thereby connecting the plurality of rechargeable energy storage cells to the electrical connection; and instructions to operably select a second position in the bypass circuit connecting a subset of the plurality of rechargeable energy storage cells to the electrical connection.

5. The subterranean energy storage and retrieval system of claim 1, further comprising:

a power management system that regulates power stored into and extracted from the energy storage cell.

6. The subterranean energy storage and retrieval system of claim 5, further comprising:

a processor;

a non-transitory computer readable medium on the processor;

a computer program comprising computer instructions executed by the processor, computer program comprising:

instructions to govern the power management system functionality;

instructions to compile data;

instructions to perform calculations; and instructions to provide information regarding a status of the energy storage cell.

7. The subterranean energy storage and retrieval system of claim 1, wherein the energy storage cell is a rechargeable battery installed within a length of tubing disposed within the wellbore casing.

8. The subterranean energy storage and retrieval system of claim 1, wherein the energy storage cell is cooled via conduction of heat into earth surrounding the wellbore through the casing.

9. A method for subterranean energy storage and retrieval, the method comprising:

deploying an energy storage cell placed in a sealed interval of a casing of a wellbore, the casing including a hydraulic seal to define the sealed interval within the wellbore; and extending an electrical connection attached to the energy storage cell to a surface of the wellbore.

10. The method of claim 9, wherein the energy storage cell is a capacitor.

11. The method of claim 9, wherein the energy storage cell is a plurality of energy storage cells, the method further comprising:

selectively connecting a subset of the plurality of energy storage cells to the electrical connection using a bypass circuit.

12. The method of claim 11, further comprising:

placing the bypass circuit in a first position in the bypass circuit thereby connecting the plurality of energy storage cells to the electrical connection; and placing the bypass circuit in a second position in the bypass circuit connecting a subset of the plurality of storage cells to the electrical connection.

13. The method of claim 9, regulating power into and extracted from the energy storage cells using a power management system.

14. The method of claim 9, wherein the energy storage cell is a rechargeable battery installed within a length of tubing disposed within the wellbore casing.

15. The method of claim 9, further comprising:

cooling the energy storage cell via conduction of heat into earth surrounding the wellbore through the casing.

16. A method, the method comprising:

sealing an interval of a casing within a wellbore;

placing a plurality of energy storage cells within the sealed interval of the casing in the wellbore;

extending an electrical connection from the plurality of energy storage cells to a surface of the wellbore; and extracting electrical energy from the energy storage cells at the surface of the wellbore via the electrical connection.

17. The method of claim 16, further comprising:

regulating the power extracted from the energy storage cells using a power management system.

18. The method of claim 16, further comprising:

isolating a subset of the energy storage cells using a bypass circuit.

19. The method of claim 16, further comprising:

cooling the energy storage cells via conduction of heat into earth surrounding the wellbore through the casing.

* * * * *